(12) United States Patent
Link

(10) Patent No.: US 11,533,531 B1
(45) Date of Patent: Dec. 20, 2022

(54) STREAMING AND SYNCHRONIZATION OF MEDIA

(71) Applicant: Nema Link, San Diego, CA (US)

(72) Inventor: Nema Link, San Diego, CA (US)

( * ) Notice: Subject to any disclaimer, the term of this patent is extended or adjusted under 35 U.S.C. 154(b) by 0 days.

(21) Appl. No.: 17/351,669

(22) Filed: Jun. 18, 2021

Related U.S. Application Data

(60) Provisional application No. 63/040,779, filed on Jun. 18, 2020.

(51) Int. Cl.
| | |
|---|---|
| *G06F 3/00* | (2006.01) |
| *G06F 13/00* | (2006.01) |
| *H04N 5/445* | (2011.01) |
| *H04N 21/43* | (2011.01) |
| *H04N 21/436* | (2011.01) |
| *H04N 21/41* | (2011.01) |
| *H04N 21/4788* | (2011.01) |
| *H04N 21/45* | (2011.01) |

(52) U.S. Cl.
CPC ..... *H04N 21/4302* (2013.01); *H04N 21/4126* (2013.01); *H04N 21/43615* (2013.01); *H04N 21/4532* (2013.01); *H04N 21/4788* (2013.01)

(58) Field of Classification Search
CPC ......... H04N 21/43076; H04N 21/2187; H04N 21/2387; H04N 21/4852; H04N 21/4302; H04N 21/4126; H04N 21/43615; H04N 21/4532; H04N 21/4788
See application file for complete search history.

(56) References Cited

U.S. PATENT DOCUMENTS

| | | | |
|---|---|---|---|
| 2009/0175282 A1* | 7/2009 | Babin | H04W 52/287 370/401 |
| 2010/0250985 A1* | 9/2010 | Gupta | G06F 1/3231 713/323 |
| 2012/0072960 A1* | 3/2012 | Rosenberg | H04N 7/17318 725/104 |
| 2015/0341688 A1* | 11/2015 | Robbins | H04L 67/306 725/14 |
| 2016/0210110 A1* | 7/2016 | Feldman | G06F 3/165 |
| 2017/0041658 A1* | 2/2017 | Mattingly | H04N 21/2541 |
| 2017/0187884 A1* | 6/2017 | Minor | H04L 65/1059 |
| 2021/0051034 A1* | 2/2021 | Jonas | H04L 12/1822 |
| 2021/0321159 A1* | 10/2021 | Aggarwal | H04N 21/6543 |

\* cited by examiner

*Primary Examiner* — Kyu Chae

(57) ABSTRACT

Some aspects include a method for synchronizing at least two devices, including: connecting the at least two devices using an application executed on each of the at least two devices, wherein: a same media is executed in synchronization by the at least two devices using the application; and an input received by the application executed on a first device of the at least two devices actuates a same response on the at least two devices.

20 Claims, 16 Drawing Sheets

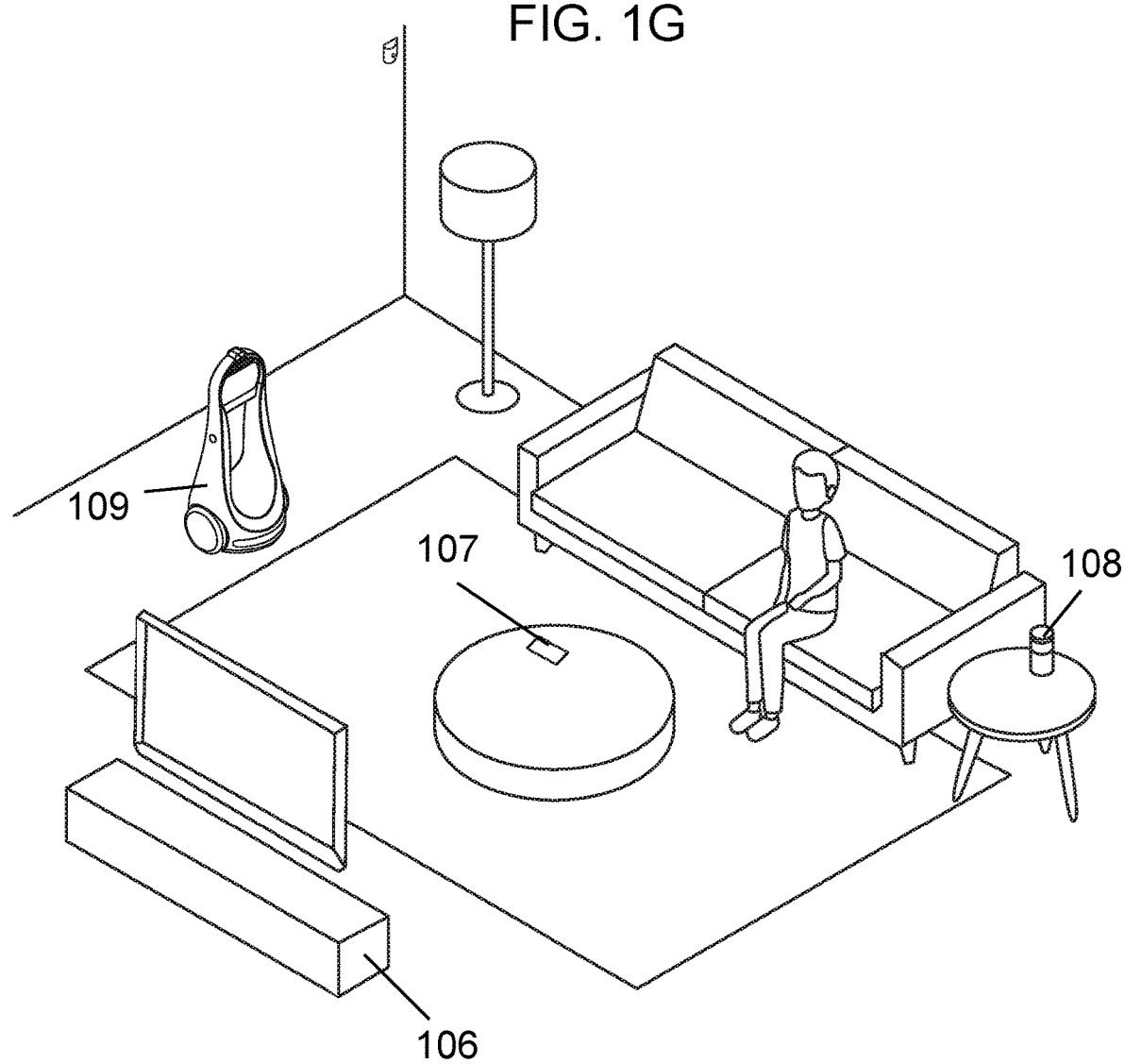

402

402

STREAMING AND SYNCHRONIZATION OF MEDIA

CROSS-REFERENCE TO RELATED APPLICATIONS

This application claims the benefit of U.S. Provisional Patent Application No. 63/040,779, filed Jun. 18, 2020, which is hereby incorporated by reference.

FIELD OF THE DISCLOSURE

This disclosure relates to streaming and synchronization of media.

SUMMARY

Some aspects include a method for synchronizing at least two devices, including: connecting the at least two devices using an application executed on each of the at least two devices, wherein: a same media is executed in synchronization by the at least two devices using the application; and an input received by the application executed on a first device of the at least two devices actuates a same response on the at least two devices.

Some aspects provide a media synchronization system, including: at least two devices executing a media synchronization application, wherein: the at least two devices are connected using the application; a same media is executed in synchronization by the at least two devices using the application; and an input received by the application executed on a first device of the at least two devices actuates a same response on the at least two devices.

BRIEF DESCRIPTION OF DRAWINGS

FIGS. 1A-1G illustrate streaming and synchronization of media on multiple devices, according to some embodiments.

DETAILED DESCRIPTION OF SOME EMBODIMENTS

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Figure 1A:
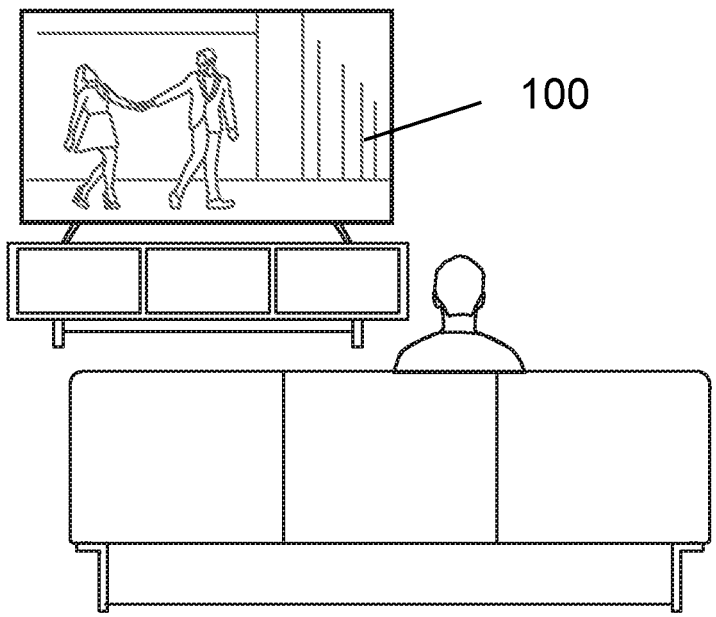
Figure 1A:
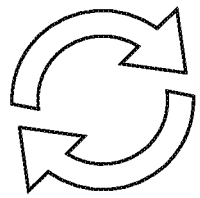
Figure 1A:
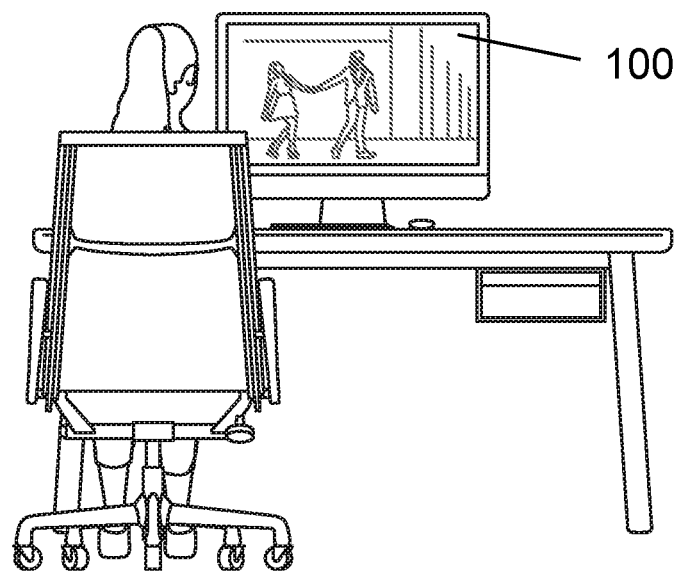
Figure 1B:
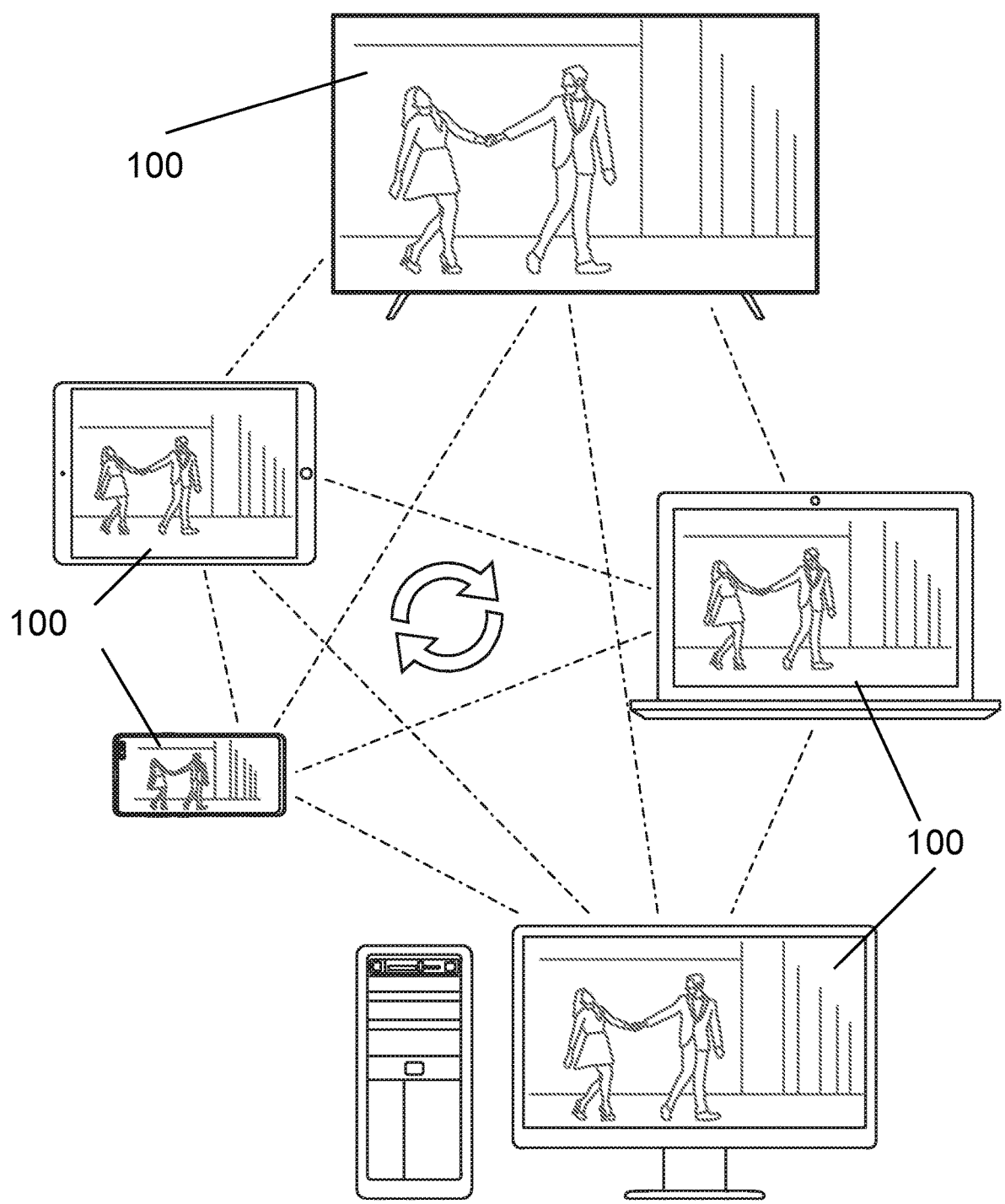
Figure 1C:
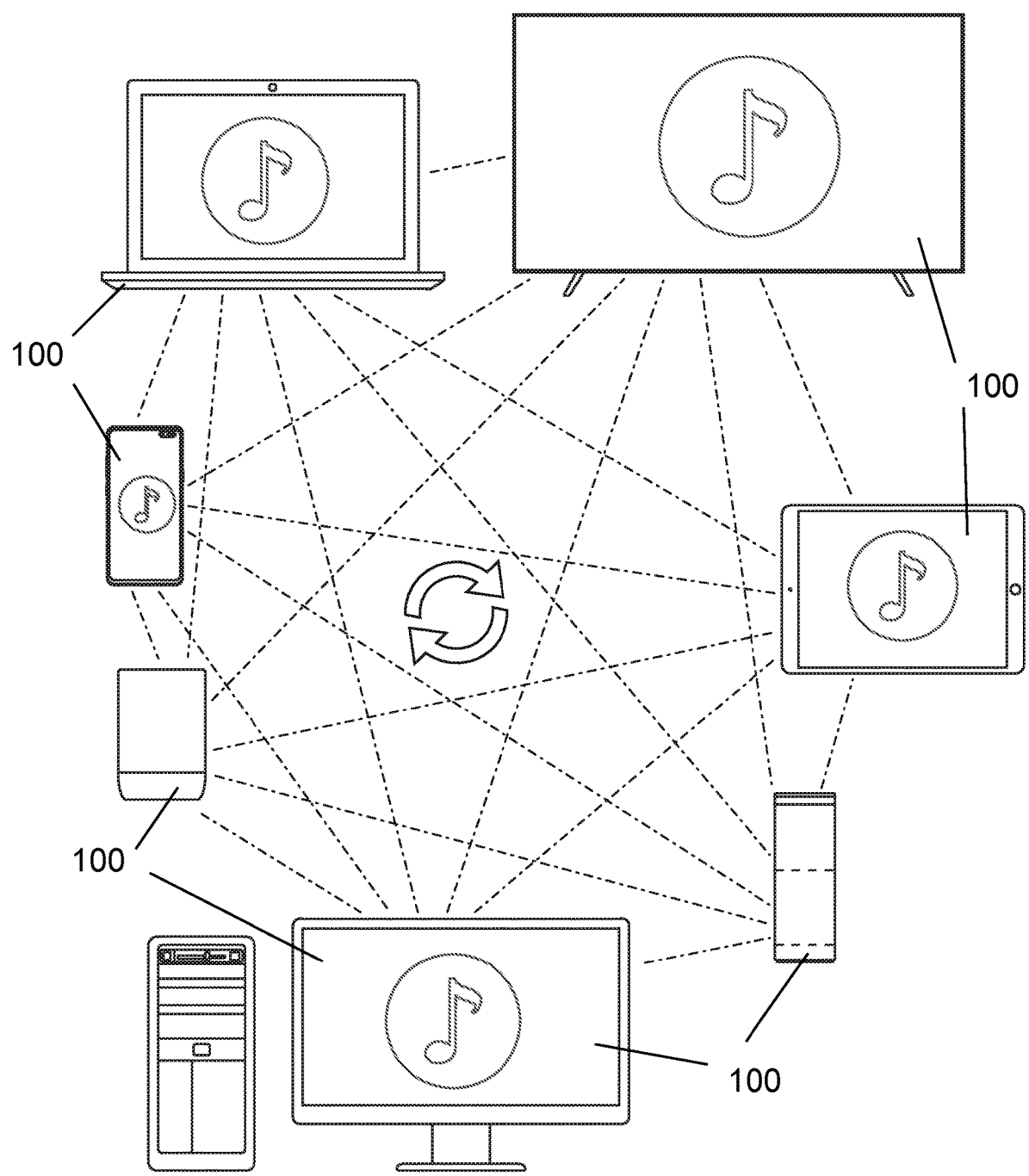
Figure 1D:
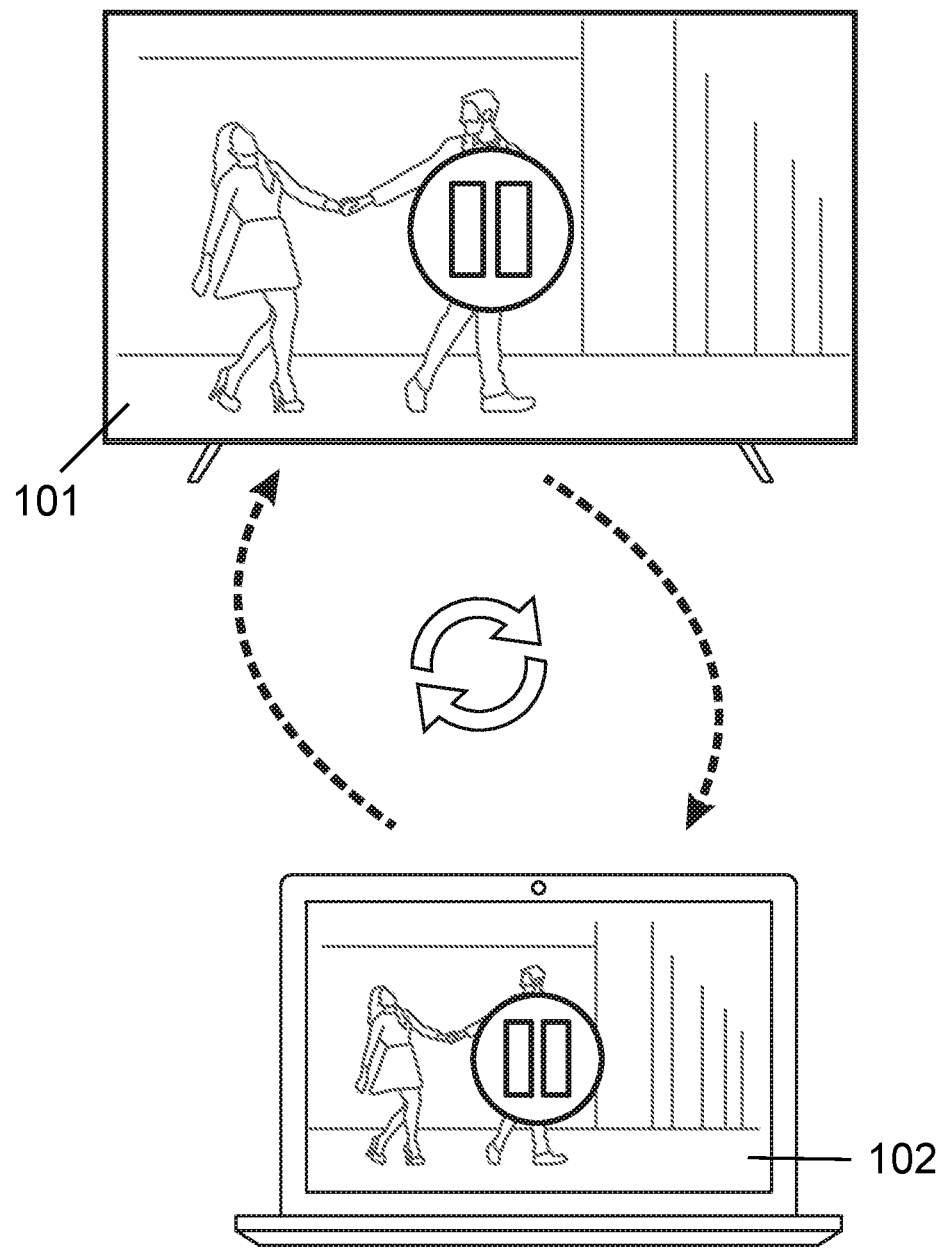
Figure 1E:
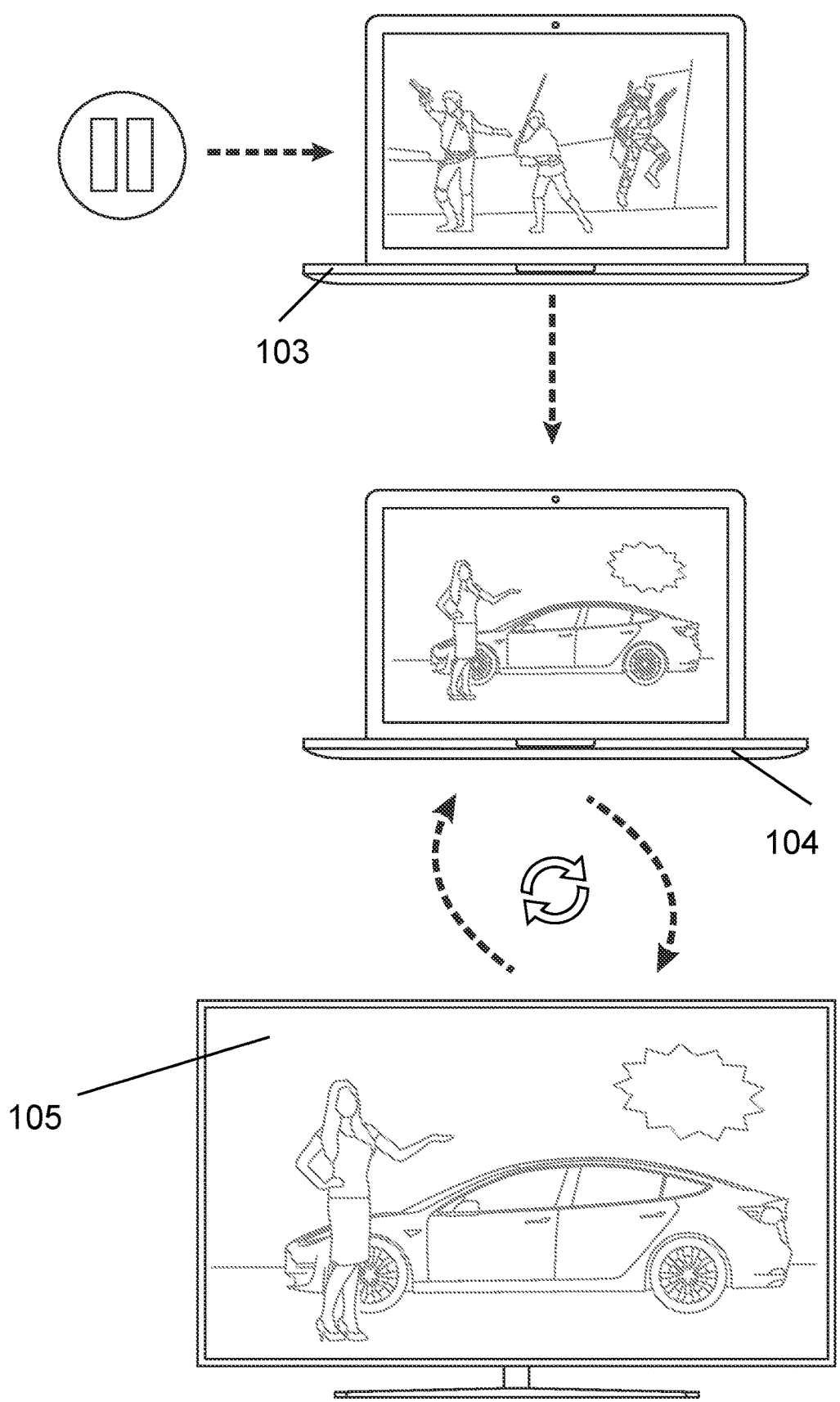
Figure 1F:
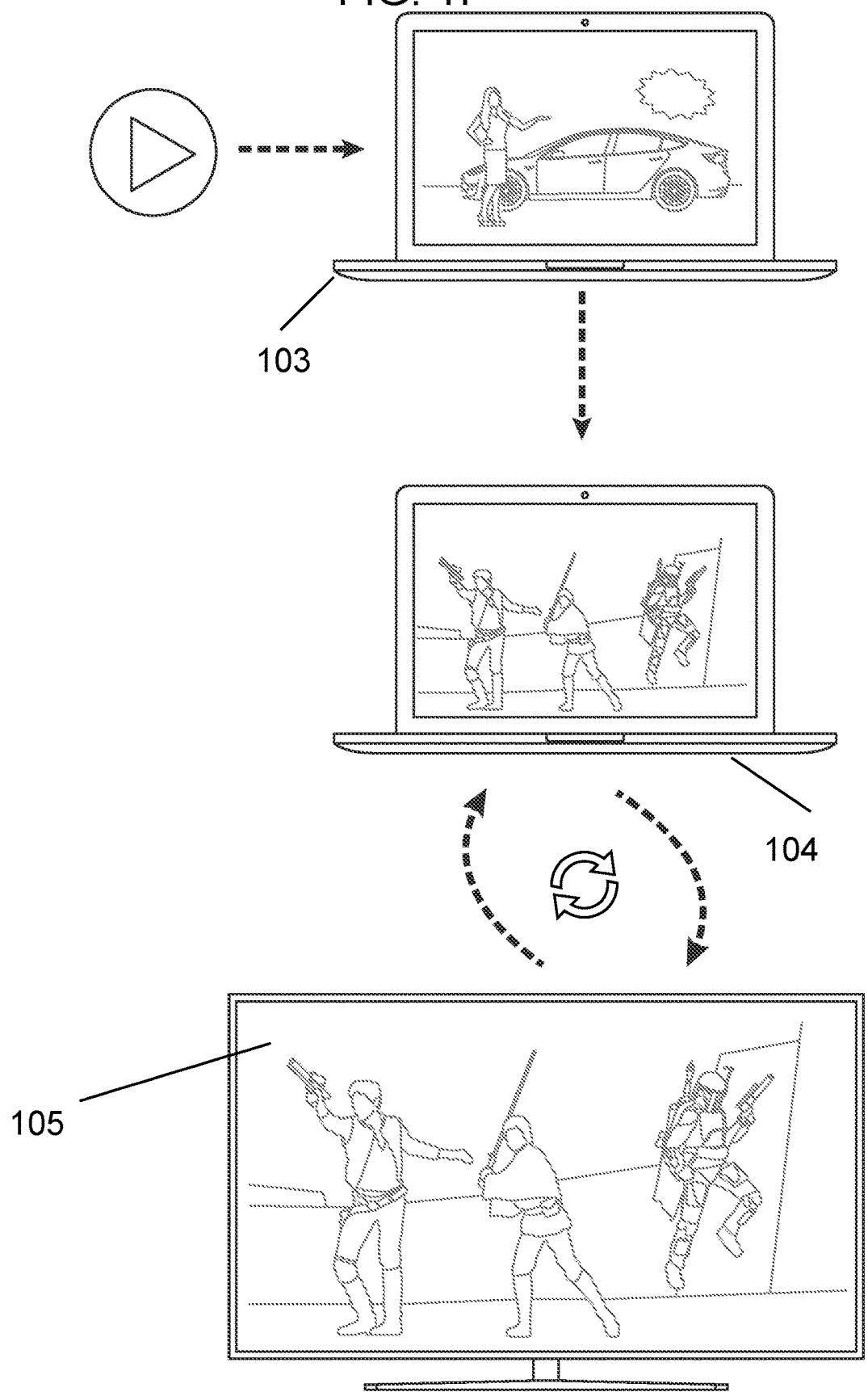

Some embodiments include methods and techniques for streaming and synchronizing various types of media, such as music, video, audio, etc., on one or more devices. In some embodiments, multiple devices (e.g., laptop, tablet, cell phone, television, smart watch, smart speakers, home-assistant, etc.) may be connected and synched such that any media (e.g., music, movies, videos, etc.) streamed or downloaded on any one device may be accessed and experienced through any one of the multiple connected devices. In some embodiments, multiple devices may connect and simultaneously experience a particular media through a social media or streaming or other type of application. FIGS. 1A-1C illustrate multiple devices 100 synched and connected such that multiple devices 100 experience the same media (e.g., videos, audio, etc.) simultaneously. In FIGS. 1A and 1B the same movie is simultaneously experienced on multiple devices 100 (laptop, cell phone, tablet, smart television, etc.). In FIG. 1C the same music is simultaneously experienced on multiple devices 100 (laptop, cell phone, tablet, smart television, home assistant, smart speaker, etc.). In some embodiments, a user of any of the connected devices may provide an input to their respective device to play, pause, rewind, fast forward, etc. the media. In some embodiments, all connected devices respond to an input provided to any one device by a user. In some embodiments, a data control channel is established between the at least two devices to maintain synchronization. In some embodiments, keep alive data packets are sent through the data control channel. In some embodiments, the users of the other connected devices may override an input provided to a device in the group of connected devices. For instance, when a first device of three connected devices simultaneously streaming a media, such as a movie, receives an input to pause or play the streaming media, the streaming media may pause on all connected devices. This is illustrated in FIG. 1D wherein a user of a first device 101 pauses the media and an application executed on another connected devices 102 simultaneously streaming the media responds and pauses the media on the device 102 as well. FIGS. 1E and 1F illustrate another example wherein a user of a first device 103 pauses the media and an application executed on two connected devices 104 and 105 simultaneously streaming the media responds and pauses the media on the two devices 104 and 105 as well. While waiting, the application used for streaming the media may play commercials on the two connected devices 104 and 105. At a later time, a user of connected device 104 may play the media, and in response the application executed on the two connected devices 103 and 105 may autonomously begin to stream the media. In some embodiments, a user of one device may play and watch commercials in advance such that the media is experienced commercial free. In some embodiments, a user of one device may watch commercials on behalf of themselves and other users such that they may all experience the media commercial free. In some cases, the users of the other devices may override the input provided to the first device and may continue streaming the media. The first user may choose to continue with the group or may pause the media and experience the media individually from where they had paused the media. In embodiments, connected devices may have the same or different owners and may be located in the same or different locations (e.g., different households). For instance, FIG. 1G illustrates multiple devices, such as smart television 106, mobile phone 107, home assistant 108, and robot 109, located within a same home.

In some embodiments, multiple smart devices may collaborate. For instance, multiple connected smart devices located within a home may detect when a user enters or leaves an area and may turn on or turn off a media as the user enters or leaves an area such that the user may continue to experience the media from different areas of their home. For example, a user may experience a playlist using the application executed on a home assistant within their kitchen. The user may leave the kitchen after cooking and enter the living room to sit on their couch. The home assistant in the kitchen may detect the user leaving the kitchen and may turn off the media played by the home assistant in the kitchen and communicate the media and current progress of the media to all other smart devices within the home. A smart television within the living room may detect the user entering the living room and may turn on the media through the application, continuing from where the media left off in the kitchen. In another example, one device may learn preferences and habits of a user and may communicate such preferences and habits to other devices (e.g., specific times the application is accessed for streaming media).

Figure 2A:
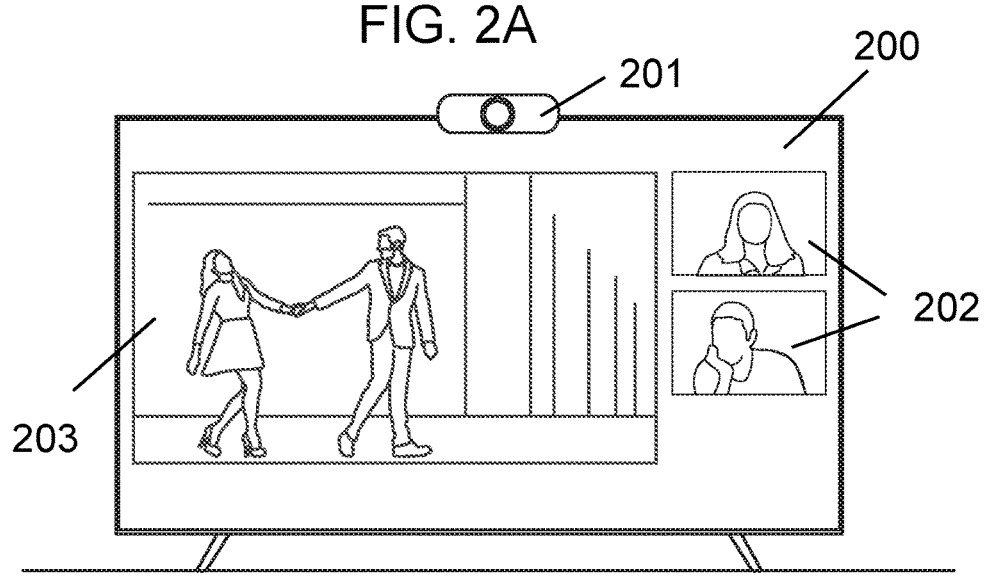
FIGS. 2A-2E illustrate streaming and synchronization of media and simultaneous telecommunication with multiple users, according to some embodiments.
Figure 2B:
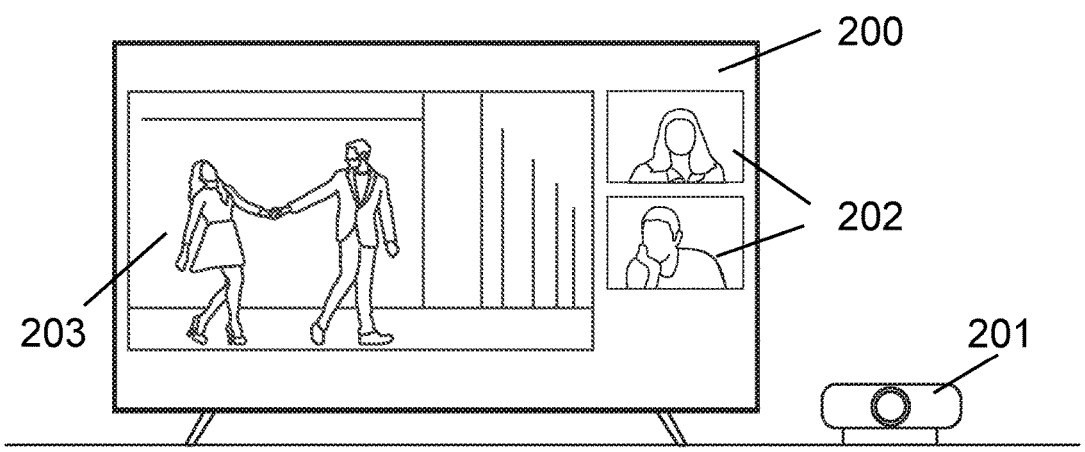
Figure 2C:
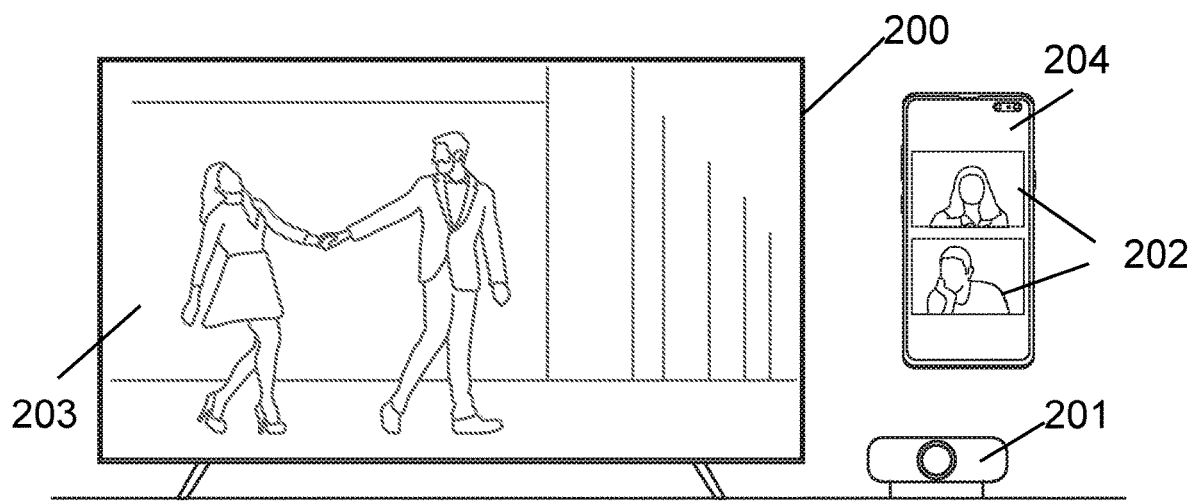
Figure 2D:
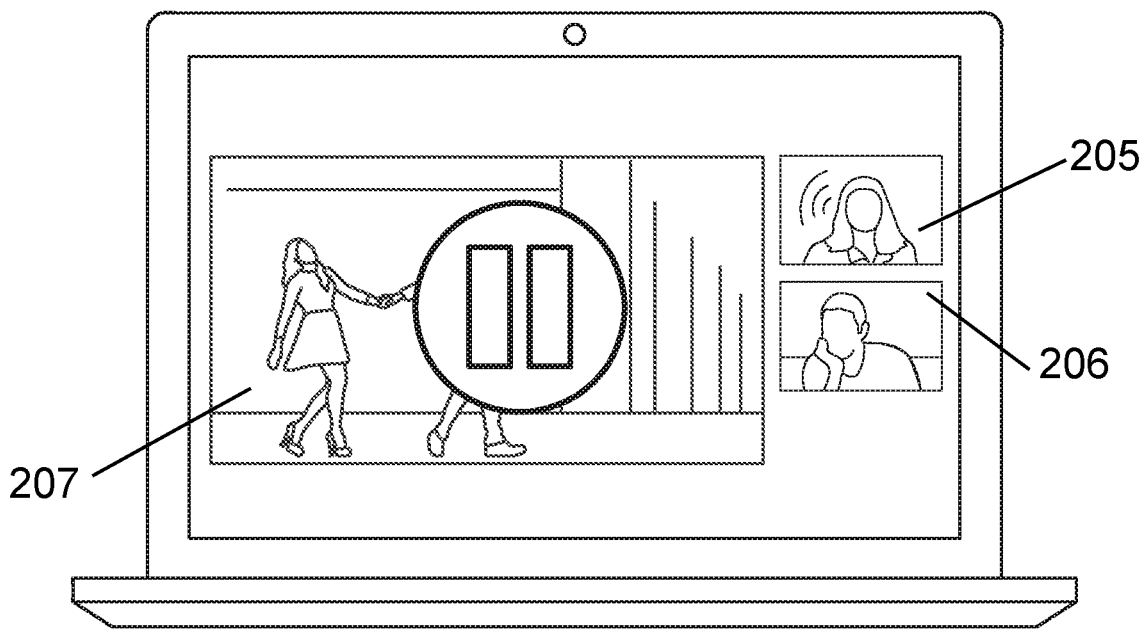
Figure 2E:
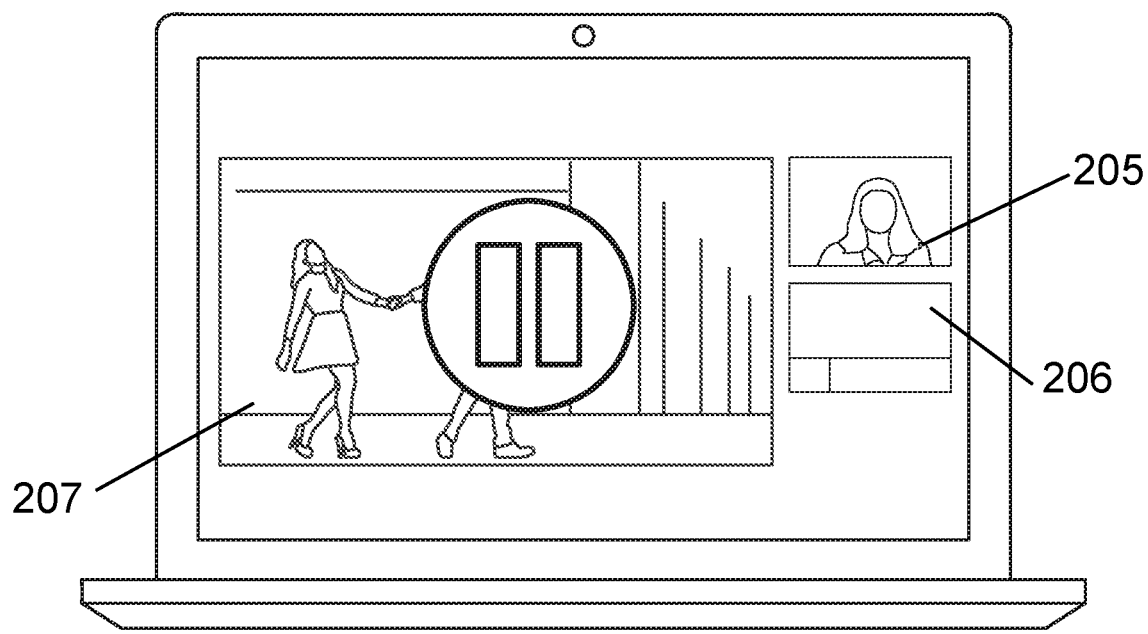

In some embodiments, multiple users may video chat while simultaneously experiencing a media. FIGS. 2A-2C illustrates a smart screen (e.g., a smart television) including a display 200 and a camera 201 that is used to execute an application for simultaneous media experience and telecommunications. The smart screen is used to simultaneously video conference various persons 202 (two in this case, but in other cases more may join) while simultaneously watching a video 203. The video 203 may be simultaneously watched by the various persons 202 through their own respective device. In some cases, the camera 201 may be integrated into the smart screen 200, as in FIG. 2A, while in other cases, the camera 201 may be a separate component, as in FIG. 2B. In some cases, the entire smart screen 200 may be used to watch the video 203 and the video chat between persons 200 may take place on a separate device 204 connected with the camera 201, as illustrated in FIG. 2C. In some cases, the media may automatically pause when a person starts speaking or leaves temporarily until the person is done speaking or returns to their seat. In FIG. 2D two persons 205 and 206 are simultaneously experiencing a movie 207. Person 205 is speaking and in response the media automatically pauses. In FIG. 2E, person 206 has left the room and in response the media automatically pauses. In each case, the media may automatically start playing after detecting no speaking and that all persons are present. Data from various sensors, such as microphones and cameras, may be used by the application to detect speaking and the presence of participants. Similar setups may be used for other types of applications. For example, multiple users may connect through the application to stream a particular playlist simultaneously while virtually having a dance party through video.

Figure 3A:
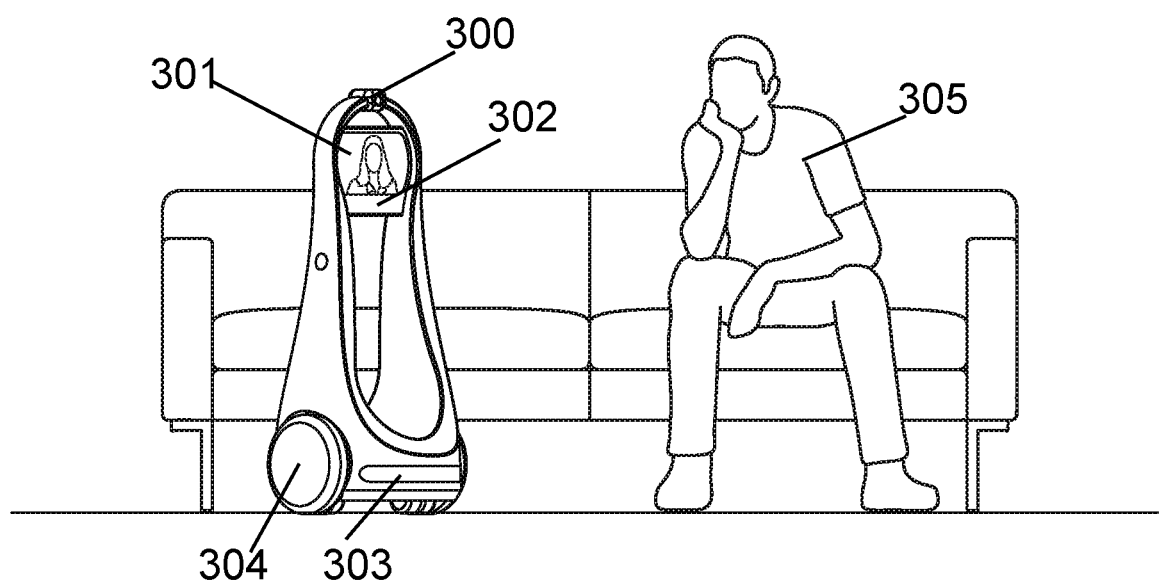
FIGS. 3A and 3B illustrate streaming and synchronization of media and telecommunication facilitated by a robot, according to some embodiments.
Figure 3A:
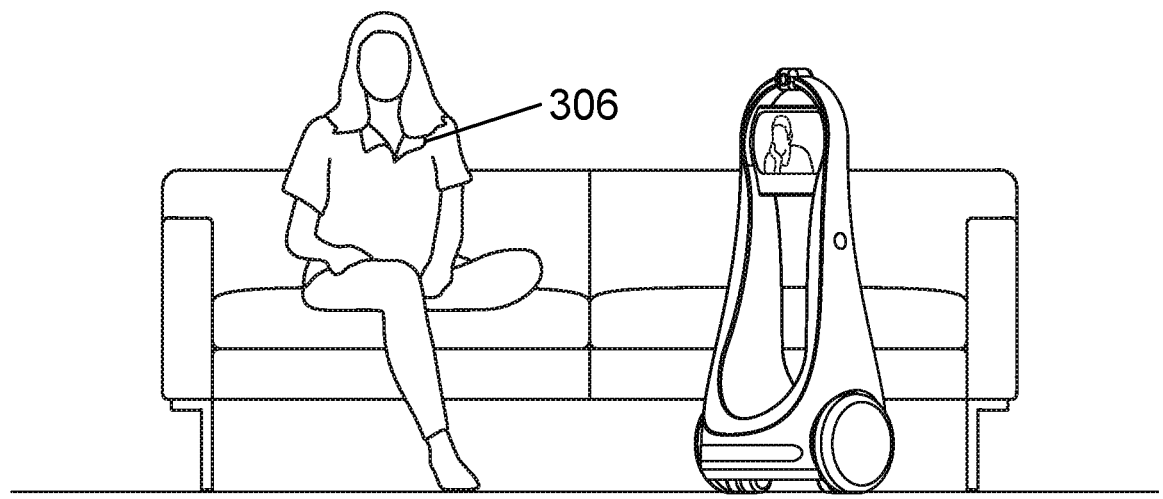
Figure 3B:
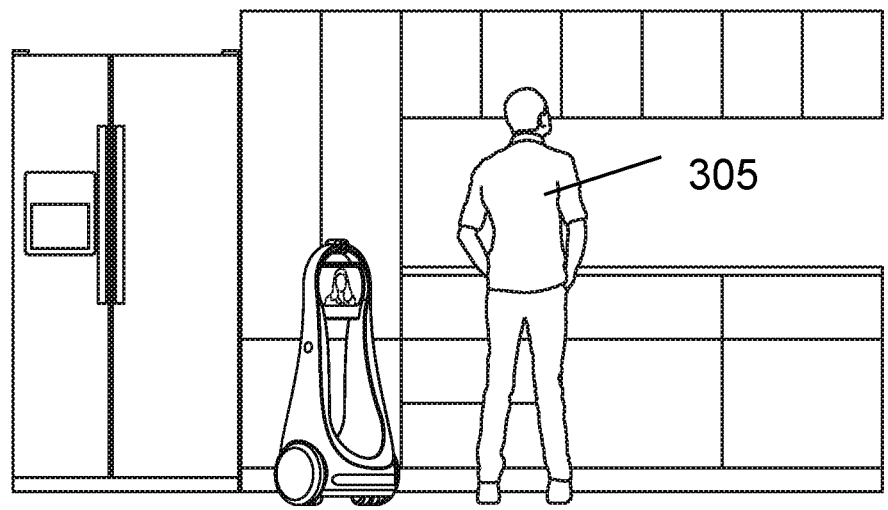
Figure 3B:
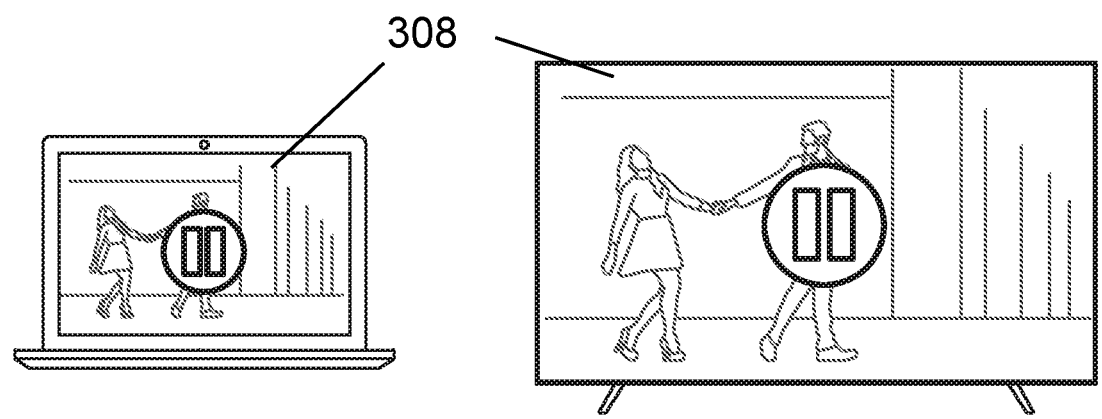
Figure 3B:
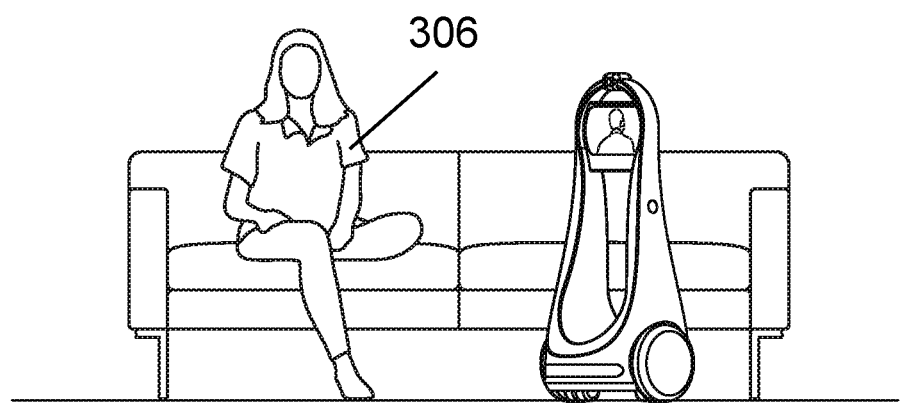

In some embodiments, a robot may facilitate teleconferencing while two or more users simultaneously experience a particular media. For example, FIG. 3A illustrates an example of a telecommunication robot including a camera 300, a display 301, a speaker 302, sensor window 303 behind which proximity sensors are housed, and drive wheels 304. Two users 305 and 306 located in separate locations and communicating with one another through video chat by using the telecommunication functions of the robot (e.g., camera, speaker, display screen, wireless communications, etc.). In some cases, both users 305 and 306 may be streaming a same media through a smart television connected with the robot. FIG. 3B illustrates the user 305 leaving the room and the robot following the user 306 such that they may continue to communicate with user 306 through video chat. The robot may also transmit an instruction to pause the media playing on their respective devices 307 when the user 305 leaves the room such that they may continue where they left off when user 305 returns to the room. The instruction may be received by an application on which the media is streaming and in response the application may pause the media. In embodiments, smart and connected homes may be capable of learning and sensing interruption during movie watching sessions. Devices such as smart speakers and home assistants may learn and sense interruptions in sound. Devices such as cell phones may notify the robot to pause the media when someone calls the user. Also, relocation of the cell phone (e.g., from one room to another) may be used as an indication the user has left the room.

In some embodiments, the robot may include voice and video capability. For example, instructions to the robot (e.g., "play movie") may be provided verbally, through user inputs using a user interface of the robot or an application paired with the robot, a gesture captured by a sensor of the robot, a physical interaction with the robot, etc. In some embodiments, the user may set up gestures via an application paired with the robot. In some embodiments, the robot may include mobility, screen, voice, and video capabilities. In some embodiments, the robot may be able to call or communicate with emergency services (e.g., 911) upon receiving an instruction from the user (using methods described above) or upon detecting an emergency using sensors, such as image, acoustic, or temperature sensors. In some embodiments, the robot may include a list of contacts, similar to a list of contacts stored in a cell phone or video conferencing application. In some embodiments, each contact may have a status (e.g., available, busy, away, idle, active, online, offline, last activity some number of minutes ago, a user defined status, etc.). In some embodiments, the robot may include cellular connectivity that it may use for contacting a contact, accessing the internet, etc. In some embodiments, the robot may pair with a smart device or a home assistant for contacting a contact and accessing the internet and other features of the smart device or home assistant. In some embodiments, each contact and their respective status may be displayed by a graphical user interface of the robot or an application paired with the robot. In some embodiments, contacts may be contacted with a phone call, video call, chat, group chat, or another means. A video call or group chat may include communication between a group of participants. In some embodiments, a history of communication may be configured to be accessible after participants have left a communication session or erased. In some embodiments, chat, voice, or video messages may be sent to contacts currently offline. In some embodiments, voice call protocols, such as G.711 a-law, mu-law, G.722 Wideband, G.729A, G.729B, iLBC (Internet Low Bandwidth Codec), and iSAC (Internet Speech Audio Codec), may be used.

In some embodiments, the teleconferencing robot may include one or more autonomous or semi-autonomous robotic devices having communication, mobility, actuation and/or processing elements. In some embodiments, the robot may include, but is not limited to include, one or more of a casing, a chassis including a set of wheels, a motor to drive the wheels, a receiver that acquires signals, a transmitter for transmitting signals, a processor, a memory storing instructions that when executed by the processor effectuates robotic operations, a controller, a plurality of sensors (e.g., tactile sensor, obstacle sensor, temperature sensor, imaging sensor, light detection and ranging (LIDAR) sensor, camera, time-of-flight (TOF) sensor, TSSP sensor, optical tracking sensor (OTS), sonar sensor, ultrasound sensor, laser sensor, light emitting diode (LED) sensor, accelerometer, odometer, gyroscope, inertial measurement unit (IMU), global-positioning-satellite (GPS), temperature sensor, humidity sensor, water sensor, pollution sensor, air particle sensor, electrical current sensor, proximity sensor, motion sensor, acoustic sensor, fire and smoke sensor, carbon monoxide sensor, radio-frequency (RF) sensor, electromagnetic signal or field sensors, optical character recognition (OCR) sensor, spectrum meters, etc.), network or wireless communications, radio frequency communications, power management such as a rechargeable battery or solar panels or fuel, and one or more clock or synchronizing devices. The processor may, for example, receive and process data from internal or external sensors, execute commands based on data received, control motors such as wheel motors, map the environment, localize the robot, determine division of the environment into zones, and determine movement paths.

In some embodiments, the processor of the robot may generate a map of the environment using data collected by sensors of the robot. In some embodiments, the sensors may include at least one imaging sensor. In one embodiment, an imaging sensor may measure vectors from the imaging sensor to objects in the environment and the processor may estimate depths to objects. In some embodiments, the processor may adjust previous data to account for a measured movement of the robot as it moves from observing one field of view to the next (e.g., differing from one another due to a difference in sensor pose). In some embodiments, a movement measuring device such as an odometer, OTS, gyroscope, IMU, optical flow sensor, etc. may measure movement of the robot and hence the sensor (assuming the two move as a single unit). In some instances, the processor matches a new set of data with data previously captured. In some embodiments, the processor compares the new data to the previous data and identifies a match when a number of consecutive readings from the new data and the previous data are similar. In some embodiments, identifying matching patterns in the value of readings in the new data and the previous data may also be used in identifying a match. In some embodiments, thresholding may be used in identifying a match between the new and previous data wherein areas or objects of interest within an image may be identified using thresholding as different areas or objects have different ranges of pixel intensity. In some embodiments, the processor may determine a cost function and may minimize the cost function to find a match between the new and previous data. In some embodiments, the processor may create a transform and may merge the new data with the previous data and may determine if there is a convergence. In some embodiments, the processor may determine a match between the new data and the previous data based on translation and rotation of the sensor between consecutive frames measured by an IMU. For example, overlap of data may be deduced based on interoceptive sensor measurements. In some embodiments, the processor may use movement of the sensor between consecutive frames to validate the match identified between the new and previous data. Or, in some embodiments, comparison between the values of the new data and previous data may be used to validate the match determined based on measured movement of the sensor between consecutive frames. For example, the processor may use data from an exteroceptive sensor (e.g., image sensor) to determine an overlap in data from an IMU, encoder, or OTS. In some embodiments, the processor may stitch the new data with the previous data at overlapping points to generate or update the map. In some embodiments, the processor may infer the angular disposition of the robot based on a size of overlap of the matching data and may use the angular disposition to adjust odometer information to overcome inherent noise of an odometer.

In embodiments, the robot may use the map to autonomously navigate the environment, e.g., accessing the map to determine that a candidate route is blocked by an obstacle denoted in the map, to select a route with a route-finding algorithm from a current point to a target point, or the like. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data.

In some embodiments, the processor of the robot uses sensor data to estimate its location within the environment prior to beginning and during the mapping process. In some embodiments, sensors of the robot capture data and the processor initially estimates the location of the robot based on sensor readings and measured movement (e.g., using devices such as a gyroscope, optical encoder, etc.) of the robot. Readings may include measurements or observations acquired by sensors of the robot or external devices such as a Wi-Fi™ camera. Each reading may provide partial information on the likely region of the state of the robot within the environment and/or may exclude the state of the robot from being within some region of the environment. For example, a depth sensor of the robot may detect an obstacle in close proximity to the robot. Based on this measurement and using the map, the processor of the robot may reduce the likelihood of the state of the robot being any state of the environment at a great distance from an obstacle. In an additional example, a measured Wi-Fi™ signal strength and a map of the expected Wi-Fi™ signal strength within the environment may be used by the processor of the robot to adjust the likelihood of robot being located at different possible states of the robot. In some embodiments, the processor generates a simulated representation of the environment for each hypothetical state of the robot. In some embodiments, the processor compares the sensor readings against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robot may generate a movement path in real-time based on the observed environment. In some embodiments, a topological graph may represent the movement path and may be described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robot as it follows along edges linked at vertices. As different topological graphs including vertices and edges with different properties are executed over time, the number of states experienced, actions taken from each state, and transitions increase. The path devised by the processor of the robot may iteratively evolve to become more efficient by choosing transitions that result in most favorable outcomes and by avoiding situations that previously resulted in unfavorable outcomes.

In some embodiments, a user may subscribe to a social media or streaming service to access the media streaming and synchronization functionalities (e.g., simultaneous media experience with a group of users) and communication functionalities (e.g., video or text chat) described above. In some embodiments, the user may be billed for the service on a periodic basis or one time. In some embodiments, the streaming or social media service may be accessed through an application of a device (e.g., cell phone, tablet, laptop, desktop computer, smart watch, smart television, etc.). Examples of an application include a mobile application, a web application, a downloadable software, etc. In some embodiments, a user may view information such as available media to stream or download, other users with which they may connect, an online/offline status of users with which they may connect, previously streamed or downloaded media, etc. using the application. In some embodiments, the user may use the application to instruct the application to play, pause, rewind, forward, share, etc. a particular media. In some embodiments, the user may choose a schedule to experience a particular media, including a time, a day, and a frequency (e.g., daily, weekly, bi-weekly, monthly, or other customization). In some embodiments, the user may schedule (e.g., day and time) experiencing a particular media using the application. In some embodiments, other users may use the application to view scheduled media experiences and may add the media experience to a calendar using the application. In some embodiments, the user that created the scheduled media experience may choose to allow anyone from the public to join, no one to join, particular users to join, or users they are friends with through the application to join. In some embodiments, the user that created the scheduled media experience may add additional details to the description of the event (e.g., a dress up theme, dance party, etc.). For example, a first user could invite another user (or a group) to dance to a song together and compete via an API to a gaming device. In some embodiments, the user may send a request or accept/decline a request to simultaneously experience a particular media with one or more other users using the application. In some embodiments, the user may create a group of users and send a request to users to simultaneously experience a particular media using the application. In some embodiments, a user may respond to the request by suggesting an alternate time to experience the media. In some embodiments, the user may create a group chat and video and/or text chat with other users using the application, in some cases while experiencing a media simultaneously with the other users. In some embodiments, the user may use the application to create a favorites list of media they are interested in experiencing. In some embodiments, a group of users may collaborate on creating a favorites list of media they are interested in experiencing. In some embodiments, a user may share a favorites list with other users using the application. In some embodiments, a user may view reviews by other users or favorites of other users using the application. In some embodiments, the user may review, accept, decline, or make changes to settings of the application, which may include, but are not limited to, a status of the user, language, subtitles, sound settings, speaker settings, etc. using the application. In some embodiments, a user may use the application to invite another user to a live or virtual game, online yoga, or a sport. In some embodiments, a user may use the application to order a food or drink item (e.g., popcorn) from an online shopping company and have it sent to another user (or group of users).

In some embodiments, the application may display information about a current status including a name of a current media experienced, the progress of the media, the total length of the media, other user experiencing the media simultaneously, reviews of the media, a rating of the media, the names of artists involved in the creation of the media, etc. In some embodiments, a historical report of prior streaming sessions may be accessed by a user using the application. In some embodiments, the historical report may include a total number of streaming hours per streaming session or historically, previously streamed media including media name and streaming date and time, issues encountered during work sessions (e.g., lag, loss of connection etc.), etc. In some embodiments, the user may use the application to view a map of their home and choose zones within which media may be experienced or not experienced. For example, the user may choose to prevent smart devices in zones close to a baby room from playing any media so as to avoid disturbing the baby. In some embodiments, the user may use the application to change a status of the user (e.g., do not disturb, available, away) for video or text chatting or simultaneous streaming purposes.

In some embodiments, the application may include a machine learning algorithm for learning media and/or setting preferences of the user or a group of users that experience media together. In some embodiments, the user may rate media using the application. In some embodiments, the application may suggest particular media (e.g., movie, television show, playlist, etc.) to the user or a group of users based on media previously experienced by the user or group of users and/or ratings the user provided for different media. In some embodiments, the user may use the application to accept/decline or modify the suggested settings and/or media experiences. In some embodiments, the application autonomously chooses settings and/or media experiences based on the machine learning algorithm. In some embodiments, the user may override the choices of the application. In some embodiments, the application may be pre-trained or pre-labeled by the user (e.g., training the application on the types of media the user prefers). In some embodiments, the classification algorithm may be tested and/or validated after training. In some embodiments, training, testing, validation, and/or classification may continue as more data is collected while the user uses the application over time. In some embodiments, data may be sent to the cloud. In some embodiments, training, testing, validation, and/or classification may be executed on the cloud. In some embodiments, labeled data may be used to establish ground truth. In some embodiments, ground truth may be optimized and may evolve to be more accurate as more data is collected. In some embodiments, labeled data may be divided into a training set and a testing set. In some embodiments, the labeled data may be used for training and/or testing the classification algorithm by a third party. In some embodiments, labeling may be used for determining the level of preferences of different media. For example, data sets may include different types of media labeled with different preference levels. In some embodiments, a user may choose to allow their data to be used for various purposes. For example, a user may consent for their data to be used for troubleshooting purposes but not for classification. In some embodiments, a set of questions or settings accessible through the application may allow the user to specifically define the nature of their consent.

In some embodiments, the application may determine probabilities for different levels of preference for a particular media. For example, in some embodiments, the application updates probabilities for different levels of preference for a movie based on previous media experiences and media ratings provided by the user. In some embodiments, the processor updates probabilities for different levels of preference for various media after each media experience. In some embodiments, the application may suggest media with high probability of a high level of preference by the user. In some embodiments, the application may infer information about the user based on information gathered on other users. In some cases, the other users may be users with which the user commonly connects with for simultaneous media experience or for telecommunication. In some cases, the other users may be users with similar preferences or with similar demographics.

In some embodiments, the application may use data collected by sensors (e.g., image sensor, acoustic sensor, heat sensor, etc.) of the device (e.g., smart screen, cell phone, tablet, etc.) to determine a level of activity or motion within the surrounding areas of the device. In some embodiments, the application may adjust settings based on the level of activity within the surroundings. For example, the application may pause a currently played media upon observing a certain level of activity or motion within the surroundings of at least one person experiencing the media. In another example, the application may increase the volume of the media upon observing animal noises (e.g., barking) in the surroundings. In some embodiments, the application may use data collected by the sensors of the device to identify a particular user. For example, image data collected by an image sensor may be used for facial recognition. In another example, acoustic data collected by an acoustic sensor may be used for voice recognition. In yet another example, wireless signals from a particular smartphone attempting to join a wireless network may indicate a particular person. In some embodiments, the application may autonomously perform actions based on recognizing a particular person. For example, the application may autonomously open a profile of the user or may load a media the user is currently in the processor of watching or may begin playing a particular playlist. In some embodiments, user recognition may be required for the user to access their profile. In some embodiments, the application may alert the user (e.g., via text message or e-mail) if someone unrecognizable attempts to access their account.

In some embodiments, a device may acquire information from external sources, such as other smart devices within a home. For example, a device acquire data from an external source that is indicative of the times of the day that a user is likely to be home and may execute the application and autonomously play a favorite playlist of the user. Information may be obtained from, for example, other sensors within the home, smart home devices, location services on a smart phone of the user, or sensed activity within the home.

In some embodiments, a user may access the application and its functionalities by various means. For example, a user may verbally command a home assistant, a smart speaker, a robot, etc. to play, pause, rewind, fast forward, share, etc. a particular media. In some embodiments, the user may use a user interface of a device to choose a particular media to play, pause, rewind, fast forward, share, etc.

In some embodiments, the user may provide verbal commands to the application. In embodiments, the application may detect the user and in response may execute the commands provided by the user (e.g., "play my favorite playlist"). In contrast, the application may detect a person that is not identified as the user and in response may ignore commands provided by the user. In some embodiments, the application may be used to give precedence to particular users. For example, the application may be used to provide an order of precedence of multiple users within a group such that the settings or choices of particular users within the group override those of other participants. For instance, while simultaneously experiencing a movie, a user with high precedence may override the choice of pausing the movie by a user with low precedence.

In some embodiments, the application may record the days and times media experiences occurred for different users and may predict the likelihood of a user using the application on a particular day and time. In some embodiments, the application may record other users the user connects with and may suggest connecting with particular users based on historical connections with other users. In some embodiments, the application may monitor the actions of the user and may autonomously perform actions or provide suggestions based on historical actions of the user. For instance, if the user often abandons media experiences part way through, the next time the user accesses the application, the application may not suggest the user continue experiencing the media.

In some embodiments, data may be saved on a local memory of a device of a user or may be saved on an external memory or on the cloud. In embodiments, application processes may be executed locally on the device or may be executed on the cloud.

In some embodiments, the application may enter a sleep mode after a predetermined amount of time of inactivity. In some embodiments, the application may log out of an account after a predetermined amount of time of inactivity. In some embodiments, the application may be used to choose the amount of time of inactivity required before the application enters sleep more or logs the user out.

In some embodiments, the user interface of the application (or interface of the robot or other means) may be used to customize the music played when a call is on hold, ring tones, message tones, and error tones. In some embodiments, the application may include audio-editing applications that may convert MP3 files a required size and format given that the user has a license to the music. In some embodiments, the application may be used to play a tutorial video for setting up the streaming or social media service. In some embodiments, there may be voice prompts that lead the user through the setup process. In some embodiments, the user may choose a language during setup. In some embodiments, the user may use the application to select a particular type of indicator be used to inform the user of new calls, emails, and video chat requests or the indicators may be set by default. For example, a message waiting indicator may be an LED indicator, a tone, a gesture, or a video played on a screen of a device. In some cases, the indicator may be a visual notification set or selected by the user. For example, the user may be notified of a call from a particular family member by a displayed picture or avatar of that family member on the screen. In other instances, other visual notifications may be set, such as flashing icons on an LCD screen (e.g., envelope or other pictures or icons set by user). In some cases, pressing or tapping the visual icon or a button on/or next to the indicator may activate an action (e.g., calling a particular person and reading a text message or an email). In some embodiments, a voice assistant may ask the user if they want to reply to a message and may listen to the user message, then send the message to the intended recipient. In some embodiments, the application may lie used to setup message forwarding, such that notifications provided to the user may be forwarded to a telephone number (e.g., home, cellular, etc.), text pager, e-mail account, chat message, etc.

In some embodiments, a user may have any of a registered email, a username, or a password which may be used to log into the application. If a user cannot remember their email, username, or password, an option to reset any of the three may be available. In some embodiments, a form of verification may be required to reset an email, password, or username. In some embodiments, a user may be notified that they have already signed up when attempting to sign up with a username and name that already exists and may be asked if they forgot their password and/or would like to reset their password.

In some embodiments, the user may answer a questionnaire using the application to determine general preferences of the user. In some embodiments, the user may answer the questionnaire before providing other information.

In some embodiments, more than one device may be connected to the application and the user may use the application to choose settings for each device. In some embodiments, the user may use the application to display all connected devices. For example, the application may display all devices in a map of a home or in a logical representation such as a list with icons and names for each device. The user may select each device to provide commands and change settings of the selected device: In some embodiments, the user may provide commands to the application via a home assistant by verbally providing commands to the home assistant which may then be transmitted to the device executing the application. In some embodiments, the application may connect with public devices. For example, the application may connect with a public television in an airport and the user may use the application to stream a show on the television. In some embodiments, the user may be logged into multiple devices at the same time. In some embodiments, the user receives notifications, alerts, phone calls, text messages, etc. on at least a portion of all devices that the user is logged into. For example, a mobile phone, a computer, and a robot of a user may ring when a phone call is received. In some embodiments, the user may select a status of do not disturb for any number of devices. For example, the user may use the application on a smart phone to set all devices to a do not disturb status. The application may transmit a synchronization message to all devices indicating a status change to do not disturb, wherein all devices refrain from pushing notifications to the user.

In some embodiments, a user interface component (e.g., virtual user interface component such as slider displayed by an application on a touch screen of a smart phone or mechanical user interface component such as a physical button) may receive an input (e.g., a setting, a schedule, a media favorites list, etc.) from the user. In some embodiments, the user interface component may display information to the user. In some embodiments, the user interface component may include a mechanical or virtual user interface component that responds to a motion (e.g., along a touchpad to adjust a setting which may be determined based on an absolute position of the user interface component or displacement of the user interface component) or gesture of the user. For example, the user interface component may respond to a sliding motion of a finger, a physical nudge to a vertical, horizontal, or arch of the user interface component, drawing a smile (e.g., to unlock the user interface of the robot), rotating a rotatable ring, and spiral motion of fingers. In some embodiments, the user may use the user interface component (e.g., physically, virtually, or by gesture) to set a setting along a continuum or to choose between discrete settings (e.g., low or high). In some embodiments, the user may zoom in or out or may use a different mechanism to adjust the response of a user interface component. For example, the user may zoom in on a screen displayed by the application to fine tune a setting with a large movement on the screen. Or the user may zoom out of the screen to make a large adjustment to a setting with a small movement on the screen or a small gesture.

In some embodiments, the user interface component may include a button, a keypad, a number pad, a switch, a microphone, a camera, a touch sensor, or other sensors that may detect gestures. In some embodiments, the user interface component may include a rotatable circle, a rotatable ring, a click-and-rotate ring, or another component that may be used to adjust a setting. For example, a ring may be rotated clockwise or anti-clockwise, or pushed in or pulled out, or clicked and turned to adjust a setting. In some embodiments, the user interface component may include a light that is used to indicate the user interface is responsive to user inputs (e.g., a light surrounding a user interface ring component). In some embodiments, the light may dim, increase in intensity, or change in color to indicate a particular setting (e.g., volume level). For example, a virtual user interface ring component may be used to adjust settings using the application and a light intensity or light color or other means may be used to indicate the responsiveness of the user interface component to the user input.

In some embodiments, a control system may manage or keeps track of all users using the application for streaming and communication (e.g., by video or text) purposes. In some embodiments, the control system may be a database. For example, a social media or streaming service may keep track of all users using the service in a database. Some examples of information that may be stored for a user may include their name, username, email, phone number, address, payment information, setting preferences, demographics, devices, etc. In some embodiments, a user may opt out of sending all or a portion of their information to the control system or database using the application.

In some embodiments, lightweight directory access protocol (LDAP) may be used to store all or a part of the user data. In some cases, other types of databases may be used to store different kinds of information. In some embodiments, the database may include fields for comprehensive user information. In some cases, some fields may be populated by default. In some embodiments, a naming convention may be used to accommodate many users with similar names, wherein the user name may have some descriptive meaning. In some embodiments, at least one parameter must be unique such that it may be used as a primary key in the database. In different embodiments, different amounts of data may be replicated and different data may be synchronized. In embodiments, data may be stored for different amounts of time and different types of data may be automatically destroyed. For example, data pulled from database A by database B may include a flag as one of the columns to set the life time of the information. Database B may then destroy the data and, in some cases, the existence of such transfer, after the elapsed time specified. Database B may sweep through the entries of the database at certain time intervals and may purge entries having a time to live that is about to expire. In some cases, database A may send a query to database B at the time of expiry of entries instructing database B to destroy the entries. In some cases, database A may send another query to determine if anything returns in order to confirm that the entries have been destroyed. Such methods may be employed in social media, wherein a user may post an event and may be provided with an option of how long that post is to be displayed for and how long the post is to be kept by the social media or streaming service. The information may be automatically deleted from the user profile based on the times chosen by the user, without the user having to do it manually. In some embodiments, the database may perform a full synchronization of all entries each time new information is added to the database. In cases where there is a large amount of data being synchronized, network congestion and server performance issues may occur. In some embodiments, synchronization intervals and scheduling may be chosen to minimize the effect on performance. In some embodiments, synchronization may be incremental (e.g., only the new or changed information is replicated) to reduce the amount of data being replicated, thereby reducing the impact on the network and servers. In some embodiments, database attribute mapping may be used when the names of attribute fields that one database uses are different from the names of equivalent attribute fields. For example, some attributes from an LDAP database may be mapped to the corresponding attributes in a different database using database attribute mapping. In some embodiments, an LDAP synchronization agreement may be created by identifying the attribute of another database to which an attribute from the LDAP database maps to. In some cases, user ID attribute may be mapped first. In some cases, LDAP database attribute fields may be manually mapped to other database attribute fields.

In some embodiments, a user may request a private facility store all their information and may only release information to any party by approval. The private facility may create databases and privately store user information. In some embodiments, the private facility may share information upon request from the user to share particular information with a specific party. In some embodiments, the private facility may request permission from the user to share their information with a specific party. The user may receive the request via an application, email, or the web and may approve the request, at which point the private facility may release the information. Multiple options for levels of approval may be used in different embodiments. For example, the user may choose to allow the information to be available to a specific party for a day, a week, a year, or indefinitely. Many different settings may be applied to various types of information. The user may set and change settings in their profile at any time using the application. For example, a user may retract permission previously approved by the user.

In some embodiments, there may be a default setting specifying where information is stored (e.g., a database owned and controlled by the user, a third party, etc.). The default settings may be changed by the user at any time. In some embodiments, the log of information stored may have various parameters set by default or by the user. Examples of parameters may include maximum events allowed in the log which limits the number of entries in the log and when the defined number is exceeded, the oldest entries are overwritten; maximum life of a log which limits the number of days and hours of entries life in the log and when the defined number is exceeded, the oldest entries are overwritten; various levels of logging which may include functionality matters, verbose for troubleshooting, security investigation (i.e., the user has gone missing), security and privacy of the user, etc.; minutes between data collection cycles which controls how frequently report data is gathered from logs (e.g., 30 minutes); days to keep data in reports database which determines when to archive the data or keep thumbnails of data; reports database size (e.g., as a percentage of capacity) which sets the maximum percentage of disk space the reports database may take up; maximum records in report output which limits the number of records presented in the report output; and maximum number of places that the reports can be logged to. The user may change default settings of parameters for the log of information at any time.

In some embodiments, data may be exchanged between a device executing the application and a control system or server of the streaming or social media service or between two or more devices using one or more wireless communication channels such as Wi-Fi or Bluetooth wireless connections. In some cases, communications may be relayed via a remote cloud-hosted application that mediates between the device and the server or the two or more devices. In embodiments, devices may use various types of networks for transmission and retrieval of data. In embodiments, wireless networks may have various categorizations such as wireless local area network (WLAN) and personal-area network (WPAN). In embodiments, a WLAN may operate in the 2.4 or 5 GHz spectrum and may have a range up to 100 m. In a WLAN, a dual-band wireless router may be used to connect laptops, desktops, tablets, cell phones, smart home assistants, smart television, robots, smart thermostats, smart security systems, and other devices. In some embodiments, a WLAN may provide mobile clients access to network resources, such as wireless print servers, presentation servers, and storage devices. In embodiments, a WPAN may operate in the 2.4 GHz spectrum. An example of a WPAN may include Bluetooth. In some embodiments, Bluetooth devices, such as headsets and mice, may use Frequency Hopping Spread Spectrum (FHSS). In some embodiments, Bluetooth piconets may consist of up to eight active devices but may have several inactive devices. In some embodiments, Bluetooth devices may be standardized by the 802.15 IEEE standard. A wireless metropolitan area network (WMAN) and a wireless wide-area network (WWAN) are other types of network. In embodiments, a WMAN may covers a large geographic area and may be used as backbone services, point-to-point, or point-to-multipoint links. In embodiments, a WWAN may cover a large geography such as a cellular service and may be provided by a wireless service provider.

In some embodiments, the wireless networks used by devices may rely on the use of a wireless router. In some embodiments, the wireless router (or any other network device) may be half duplex or full duplex, wherein full duplex allows two parties to communicate with each other simultaneously and half duplex allows two parties to communicate with each other, but not simultaneously. In some embodiments, the wireless router may have the capacity to act as a network switch and create multiple subnets or virtual LANs (VLAN), perform network address translation (NAT), or learn MAC addresses and create MAC tables. In some embodiments, a Basic Service Area (BSA) of the wireless router may be a coverage area of the wireless router. In some embodiments, the wireless router may include an Ethernet connection. For example, the Ethernet connection may bridge the wireless traffic from the wireless clients of a network standardized by the 802.11 IEEE standard to the wired network on the Ethernet side, standardized by the 802.3 IEEE standard, or to the WAN through a telecommunication device. In some embodiments, the wireless router may be the telecommunication device.

In some embodiments, the wireless router may have a Service Set Identifier (SSID), or otherwise a network name. In some embodiments, the SSID of a wireless router may be associated with a MAC address of the wireless router. In some cases, the SSID may be a combination of the MAC address and a network name. When the wireless router offers service for only one network, the SSID may be referred to as a basic SSID (BSSID) and when the wireless router allows multiple networks through the same hardware, the SSID may be referred to as a Multiple BSSID (MBSSID).

In some embodiments, the environment of a device may include more than one wireless router. In some embodiments, the device may be able to roam and move from one wireless router to another during use of the application. This may useful in larger areas, such as an airport. In some embodiments, the device may be able to roam from a wireless router with a weak signal to a wireless router with a strong signal. In some embodiments, there may be threshold that must be met prior to roaming from one wireless router to another or a constant monitoring may be used. In some embodiments, the application may know the availability of wireless routers based on the location of the device. In embodiments, the BSA of each wireless router must overlap and the wireless routers must have the same SSID for roaming to function. For example, as a device moves the application may observe the same SSID while the MAC address changes. In some embodiments, the wireless routers may operate on different channels or frequency ranges that do not overlap with one another to prevent co-channel interference. In some cases, this may be challenging as the 2.40 GHz spectrum on which the network devices may operate includes only three non-overlapping channels. In some embodiments, an Extended Service Set (ESS) may be used, wherein multiple wireless networks may be used to connect clients.

In some embodiments, connected devices within a same environment may communicate (e.g., when collaborating on playing a particular media) through two or more linked LANs. In some embodiments, a wireless bridge may be used to link two or more LANs located within some distance from one other. In embodiments, bridging operates at layer 2 as the LANs do not route traffic and do not have a routing table. In embodiments, bridges may be useful in connecting remote sites, however, for a point-to-multipoint topology, the central wireless device may experience congestion as each device on an end must communicate with other devices through the central wireless device. In some embodiments, a mesh may alternatively be used, particularly when connectivity is important, as multiple paths may be used for communication. Some embodiments may employ the 802.11s IEEE mesh standard. In some embodiments, a mesh network may include some nodes (i.e., network devices) connected to a wired network, some nodes acting as repeaters, some nodes operating in layer 2 and layer 3, some stationary nodes, some mobile nodes, some roaming and mobile nodes, some nodes with long distance antennas, and some nodes with short distance antennas and cellular capability. In some embodiments, a mesh node may transmit data to nearby nodes or may prune data intelligently. In some embodiments, a mesh may include more than one path for data transmission. In some embodiments, a special algorithm may be used to determine the best path for transmitting data from one point to another. In some embodiments, alternative paths may be used when there is congestion or when a mesh node goes down. In some embodiments, graph theory may be used to manage the paths. In some embodiments, special protocols may be used to control loops when they occur. For example, at layer 2 a spanning tree protocol may be used and at layer 3 Internet Protocol (IP) header Time to Life (TTL) may be used.

In some embodiments, devices may communicate by broadcasting packets. For example, a smart television may broadcast packets and everyone smart device in the same environment may receive the packets. In some embodiments, devices may communicate using multicast transmission. A unicast transmission may include sending packets to a single recipient on a network, whereas multicast transmission may include sending packets to a group of devices on a network. For example, a unicast may be started for a source to stream data to a single destination and if the stream needs to reach multiple destinations concurrently, the stream may be sent to a valid multicast IP address ranging between 224.0.0.0 and 239.255.255.255. In embodiments, the first octet (i.e., 224.xxx.xxx.xxx) of the multicast IP address range may be reserved for administration. In some embodiments, multicast IP addresses may be identified by the prefix bit pattern of 1110 in the first four bits of the first octet, and belong to a group of addresses designated as Class D. The multicast IP addresses ranging between 224.0.0.0 and 239.255.255.255 are divided into blocks, each assigned a specific purpose or behavior. For example, the range of 224.0.0.0 through 224.0.0.255, known to be the Local Network Control Block is used by network protocols on a local subnet segment. Packets with an address in this range are local in scope and are transmitted with a TTL of one so that they go no farther than the local subnet. Or the range of 224.0.1.0 through 224.0.1.255 is the Inter-Network Control Block. These addresses are similar to the Local Network Control Block except that they are used by network protocols when control messages need to be multicast beyond the local network segment. Other blocks may be found on Internet Assigned Numbers Authority (IANA). Some embodiments may employ 802.2 IEEE standards on transmission of broadcast and multicast packets. For example, bit 0 of octet 0 of a media access control address (MAC) address may indicate whether the destination address is a broadcast/multicast address or a unicast address. Based on the value of bit 0 of octet 0 of the MAC address, the MAC frame may be destined for either a group of hosts or all hosts on the network.

In some embodiments, layer 2 multicasting may be used to transmit IP multicast packets to a group of hosts on a LAN. In some embodiments, 23 bits of MAC address space may be available for mapping a layer 3 multicast IP address into a layer 2 MAC address. Since the first four bits of a total of 32 bits of all layer 3 multicast IP addresses are set to 0x1110, 28 bits of meaningful multicast IP address information is left. Since all 28 bits of the layer 3 IP multicast address information may not be mapped into the available 23 bits of the layer 2 MAC address, five bits of address information are lost in the process of mapping, resulting in a 32:1 address ambiguity. In embodiments, a 32:1 address ambiguity indicates that each multicast MAC address can represent 32 multicast IP addresses, which may cause potential problems. For example, devices subscribing to the multicast group 224.1.1.1 may program their hardware to interrupt the CPU when a frame with a destination multicast MAC address of 0x0100.5E00.0101 is received. However, this multicast MAC address may be concurrently used for 31 other multicast IF groups. If any of these 31 other IP groups are also active on the same LAN, the CPU of the device may receive interrupts when a frame is received for any of these other IP groups. In such cases, the CPU must examine the IP portion up to layer 3 of each received frame to determine if the frame is from the subscribed group 224.1.1.1. This may affect the CPU power available to the device if the number of false positives from unsubscribed group traffic is high enough.

In some embodiments, rendezvous points may be used to manage multicast, wherein unicast packets may be sent up to the point of subscribers. In some embodiments, controlling IP multicast traffic on WAN links may be important in avoiding saturation of low speed links by high rate groups. In some embodiments, control may be implemented by deciding who can send and receive IP multicast. In some embodiments, any multicast source may send to any group address and any multicast client may receive from any group despite geography. In some embodiments, administrative or private address space may be used within an enterprise unless multicast traffic is sourced to the Internet.

In some embodiments, a first device may be coupled with other devices (such as robots, home assistants, cell phones, tablets, laptop, smart watch, smart television, etc.) via one or more networks (e.g., wireless or wired). For example, a first smart device and other smart devices may be in communication with each other over a LAN or other types of private networks, such as a Bluetooth connected workgroup or a public network (e.g., the internet or cloud). In some embodiments, a device may be in communication with other devices, such as servers, via the internet. In some embodiments, a first device may receive a set of data or commands from another device, a computing device, a content server, a control server, or any combination thereof located locally or remotely with respect to the first device. In some embodiments, a device may receive the set of data or commands from a device external to a private network. In some embodiments, the application used for experiencing media executed on a device may offload some of the more process or power intensive tasks to other devices in a network (e.g., local network) or on the cloud.

In some embodiments, each network device may be assigned an IF or device identification (ID) from a local gateway. In some embodiments, the local gateway may have a pool of IP addresses configured. In some cases, the local gateway may exclude a few IP addresses from that range as they may be assigned to other pools, some devices may need a permanent IP, or some IP addresses in the continuous address space may have been previously statically assigned. When an IP is assigned (or otherwise leased), additional information may also be assigned. For example, default gateway, domain name, a TFTP server, an FTP server, an NTP server, DNS sever, or a server from which the device may download most updates for its firmware, etc. For example, the application may download its clock from an NTP server or have the clock manually adjusted by the user. The application may detect its own time zone, detect daylight time savings based on the geography, and other information. Any of this information may be manually set as well. In some cases, there may be one or more of each server and the device may try each one. In some embodiments, language support may be included in the IP lease or may be downloaded from a server (e.g., Trivial File Transfer Protocol (TFTP) server). Examples of languages supported may include English, French, German, Russian, Spanish, Italian, Dutch, Norwegian, Portuguese, Danish, Swedish, and Japanese. In some embodiments, a language may be detected and in response the associated language support may be downloaded and stored locally. If the language support is not used from a predetermined amount of time it may be automatically removed. In some embodiments, a TFTP server may store a configuration file for each device that each device may download to obtain the information they need. In some cases, there may be files with common settings and files with individual settings. In some embodiments, the individual settings may be defined based on location, MAC address, etc. In some embodiments, a dynamic host configuration protocol (DHCP), such as DHCP option 150, may be used to assign IP addresses and other network parameters to each device on the network. In some cases, a hacker may spoof the DHCP server to set up a rogue DHCP server and respond to DHCP requests from a device. This may be simultaneously performed with a DHCP starvation attack wherein the victim server does not have any new IP addresses to give out, thereby raising the chance of the device using the rouge DHCP server. Such cases may lead to the device downloading bad firmware and may be compromised. In order to alleviate these problems, a digital signature may be used. In some embodiments, the device refrains from installing firmware that is not confirmed to have come from a safe source.

In some embodiments, a first device may transmit an initial radio broadcast message to discover other devices (e.g., home assistant, smart television, smart watch, tablet, laptop, mobile phone, smart speaker, robot, etc.) capable of communication within the area. In some embodiments, the first device may discover the existence of another device capable of communication based on a configuration the first device performs on the other device or a command input provided to a graphical user interface. In some embodiments, devices may use Transmission Control Protocol and the Internet Protocol (TCP/IP) for communication. In some embodiments, communication between devices may occur over a layer two protocol. In some embodiments, a device may possess a MAC address and in some embodiments the device may transmit the MAC address to other devices or a wireless router. In some embodiments, an endpoint device may operate within a local area network. In some embodiments, a device may include a network interface card or other network interface device. In some embodiments, a device may be configured to dynamically receive a network address or a static network address may be assigned. In some embodiments, the option may be provided to the user through the application. In some embodiments, in dynamic mode, a device may request a network address through a broadcast. In some embodiments, a nearby device may assign a network address from a pre-configured pool of addresses. In some embodiments, a nearby device may translate the network address to a global network address or may translate the network address to another local network address. In some embodiments, network address translation methods may be used to manage the way a local network communicates with other networks. In some embodiments, a Domain Name System (DNS) name may be used to assign a host name to a device.

In some embodiments, each wireless client within a range of a wireless router may advertise one or more SSID (e.g., each smart device of a smart home). In some embodiments, two or more networks may be configured to be on different subnets and devices may associate with different SSIDs, however, a wireless router that advertises multiple SSIDs uses the same wireless radio. In some embodiments, different SSIDs may be used for different purposes. For example, one SSID may be used for a network with a different subnet than other networks and that may be offered to guest devices. Another SSID may be used for a network with additional security for authenticated devices of a home or office and that places the devices in a subnet. In some embodiments, a device may include an interface which may be used to select a desired SSID. In some embodiments, an SSID may be provided to the device by entering the SSID into the application. In some embodiments, a device may have a preferred network configured or a preferred network may be chosen through the application after a pairing process. In some embodiments, configuration of a wireless network connection may be provided to a device using a paired device such as a smart phone or through an interface of the device. In some embodiments, the pairing process between a first device and the application used for experiencing media may require a wireless router to be within a same vicinity. The application may be executed on a second device. In some embodiments, a button of the first device may be pressed to initiate the pairing process. In some embodiments, holding the button of the first device for a few seconds may be required to avoid accidental changes in settings. In some embodiments, an indicator (e.g., a light, a noise, vibration, etc.) may be used to indicate the first device is in pairing mode. For example, LEDs positioned on the first device may blink to indicate the first device is in pairing mode. In some embodiments, the application may display a button that may be pressed to initiate the pairing process with the first device. In some embodiments, the application may display a list of available SSIDs. In some embodiments, a user may use the application to manually enter an SSID. In some embodiments, the pairing process may require that the device on which the application is executed activate location services such that available SSIDs within the vicinity may be displayed. In some embodiments, the application may display an instruction to activate location services when a global setting on the operating system (OS) of the device executing the application has location services deactivated. In cases wherein location services is deactivated, the SSID may be manually entered using the application. In some embodiments, the second device may include a Bluetooth wireless device that may help the first device in finding available SSIDs regardless of activation or deactivation of location services. This may be used as a user-friendly solution in cases wherein the user may not want to activate location services. In some embodiments, the pairing process may require the device on which the application is executed and other devices connected to the application to be connected to the same network or SSID. In some embodiments, it may be preferable for a device to use a 2.4 Ghz network as it may roam around the house and may end up on places where a signal strength of a 5 Ghz network is weak. In some embodiments, a 5 Ghz network may be preferred within an environment having multiple wireless repeaters and a signal with good strength. In some embodiments, a device may automatically switch between networks as the data rate increases or decreases.

In some embodiments, a device may wirelessly join a local network by passively scanning for networks and listening on each frequency for beacons being sent by a wireless router. Alternatively, the device may use an active scan process wherein a probe request may be transmitted in search of a specific wireless router. In some embodiments, the client may associate with the SSID received in a probe response or in a heard beacon. In some embodiments, the device may send a probe request with a blank SSID field during active scanning. In some embodiments, wireless routers that receive the probe request may respond with a list of available SSIDs. In some embodiments, the device may connect with one of the SSIDs received from the wireless router if one of the SSIDs exists on a preferred networks list of the device. If connection fails, the device may try an SSID existing on the preferred networks list that was shown to available during a scan.

In some embodiments, a device may send an authentication request after choosing an SSID. In some embodiments, the wireless router may reply with an authentication response. In some embodiments, the device may send an association request, including the data rates and capabilities of the device after receiving a successful authentication response from the wireless router. In some embodiments, the wireless router may send an association response, including the data rates that the wireless router is capable of and other capabilities, and an identification number for the association. In some embodiments, a speed of transfer may be determined by a Received Signal Strength Indicator (RSSI) and signal-to-noise ratio (SNR). In some embodiments, the device may choose the best speed for transmitting information based on various factors. For example, management frames may be sent at a slower rate to prevent them from becoming lost, data headers may be sent at a faster rate than management frames, and actual data frames may be sent at the fastest possible rate. In some embodiments, the device may send data to other devices on the network after becoming associated with the SSID. In embodiments, the device may communicate with devices within the same subnet or other subnets. Based on normal IP rules, the device may first determine if the other device is on the same subnet and then may decide to use a default gateway to relay the information. In some embodiments, a data frame may be received by a layer 3 device, such as the default gateway. In some embodiments, the frame may then be encapsulated in Internet Protocol Version 4 (IPV4) or IPV6 and routed through the WAN to reach a desired destination. Data traveling in layer 3 allows the device to be controllable via a local network, the cloud, an application connected to wireless LAN, or cellular data. In some embodiments, upon receiving the data at a cellular tower, devices such as Node B, a telecommunications node in mobile communication networks applying the Universal Mobile Telecommunications Service (UMTS) standard, may provide a connection between the device from which data is sent and the wider telephone network. Node B devices may be connected to the mobile phone network and may communicate directly with mobile devices. In such types of cellular networks, mobile devices do not communicate directly with one another but rather through the Node B device using RF transmitters and receivers to communicate with mobile devices.

In some embodiments, a client that has never communicated with a default gateway may use Address Resolution Protocol (ARP) to resolve its MAC address. In some embodiments, the client may examine an ARP table for mapping to the gateway, however if the gateway is not there the device may create an ARP request and transmit the ARP request to the wireless router. For example, an 802.11 frame including four addresses: the source address (SA), destination address (DA), transmitter address (TA), and receiving address (RA) may be used. In this example, the SA is the MAC of the device sending the ARP request, the DA is the broadcast (for the ARP), and the RA is the wireless router. In some embodiments, the wireless router may receive the ARP request and may obtain the MAC address of the device. In some embodiments, the wireless router may verify the frame check sequence (FCS) in the frame and may wait the short interframe space (SIFS) time. When the SIFS time expires, the wireless router may send an acknowledgement (ACK) back to the device that sent the ARP request. The ACK is not an ARP response but rather an ACK for the wireless frame transmission. In embodiments wherein the number of wireless routers are more than one, a Lightweight Access Point Protocol (LWAPP) may be used wherein each wireless router adds its own headers on the frames. In some embodiments, a switch may be present on the path of the device and wireless router. In some embodiments, upon receiving the ARP request, the switch may read the destination MAC address and flood the frame out to all ports, except the one it came in on. In some embodiments, the ARP response may be sent back as a unicast message such that the switch in the path forwards the ARP response directly to the port leading to the device. At such a point, the ARP process of the client may have a mapping to the gateway MAC address and may dispatch the awaiting frame using the process described above, a back off timer, a contention window, and eventually transmitting the frame following the ARP response.

Some embodiments may employ virtual local area networks (VLANs). In such embodiments, upon receiving the ARP request, the frame may be flooded to all ports that are members of the same VLAN. A VLAN may be used with network switches for segmentation of hosts at a logical level. By using VLANs on the wired side of the wireless router, the subnet may be logically segmented, just as it is on the wireless space. For example, the result may be SSID=Logical Subnet=Logical VLAN or Logical Broadcast Domain. After the wireless frames move from the wireless connection to the wired network, they must share a single physical wire. In some embodiments, the 802.1Q protocol may be used to place a 4-byte tag in each 802.3 frame to indicate the VLAN.

In some embodiments, a hacker may attempt to transmit an ARP response from a host with a MAC address that does not match the MAC address of the host from which the ARP request was broadcasted. In some embodiments, device to device bonds may be implemented using a block chain to prevent any attacks to a network of devices. In some embodiments, the devices in the network may be connected together in a chain and for a new device to join the network it must first establish a bond. In some embodiments, the new device must register in a ledger and an amount of time must pass, over which trust between the new device and the devices of the network is built, before the new device may perform certain actions or receive certain data.

Examples of data that a frame or packet may carry includes control data, payload data, digitized voice, digitized video, voice control data, video control data, and the like.

In some embodiments, a device may search for an ad hoc network in the list of available networks when none of the SSIDs that were learned from the active scan or from the preferred networks list result in a successful connection. An ad hoc connection may be used for communication between two devices without the need for a wireless router in between the two devices. In some cases, ad hoc connections may not scale well for multiple device but may be possible. In some embodiments, a combination of ad hoc and wired router connections may be possible. In some embodiments, a device may connect to an existing ad hoc network. In some embodiments, a device may be configured to advertise an ad hoc connection. In some embodiments, a device may be configured to refrain from connecting to ad hoc networks. In some embodiments, a first device may set up a radio work group, including a name and radio parameters, and a second device may use the radio work group to connect to the first device. This may be known as a Basic Service Set or Independent Basic Service Set, which may define an area within which a device may be reachable. In some embodiments, each device may have one radio and may communicate in a half-duplex at a lower data rate as information may not be sent simultaneously. In some embodiments, each device may have two radios and may communicate in a full duplex.

In embodiments, authentication and security when using the application on a device are important and may be configured. For example, WPA-802.1X protocol may be used to authenticate a device before joining a network. Other examples of protocols for authentication may include Lightweight Extensible Authentication Protocol (LEAP), Extensible Authentication Protocol Transport Layer Security (EAP-TLS), Protected Extensible Authentication Protocol (PEAP), Extensible Authentication Protocol Generic Token Card (EAP-GTC), PEAP with EAP Microsoft Challenge Handshake Authentication Protocol Version 2 (EAP MS-CHAP V2), EAP Flexible Authentication via Secure Tunneling (EAP-FAST), and Host-Based EAP. In some embodiments, a pre-shared key or static Wired Equivalent Privacy (WEP) may be used for encryption. In other embodiments, more advanced methods, such as WPA/WPA2/CCKM, may be used. In some embodiments, WPA/WPA2 may allow encryption with a rotated encryption key and a common authentication key (i.e., a passphrase). Encryption keys may have various sizes in different protocols, however, for more secure results, a larger key size may be used. Examples of key size include a 40 bit key, 56 bit key, 64 bit key, 104 bit key, 128 bit key, 256 bit key, 512 bit key, 1024 bit key, and 2048 bit key. In embodiments, encryption may be applied to any wireless communication using a variation of encryption standards.

In some embodiments, EAP-TLS, a commonly used EAP method for wireless networks, may be used. EAP-TLS encryption is similar to SSL encryption with respect to communication method, however EAP-TLS is one generation than SSL. EAP-TLS establishes an encrypted tunnel and the user certificate is sent inside the tunnel: In EAP-TLS, a certificate is needed and is installed on an authentication server and the supplicant and both client and server key pairs are first generated then signed by the CA server. In some embodiments, the process may begin with an EAP start message and the wireless router requesting an identity of the device. In some embodiments, the device may respond via EAP over RADIUS to the authentication server, the authentication server may send its certificate, and the client may send its certificate, thereby revealing their identity in a trusted way. In some embodiments, a master session key or symmetric session keys may then be created. In some embodiments, the authentication server may send the master session key to the wireless router to be used for either WEP or WPA/WPA2 encryption between the wireless router and the device.

WPA was introduced as a replacement for WEP and is based on the IEEE 802.11i standard. More specifically, WPA includes support for Advanced Encryption Standard (AES) and Cipher Block Chaining Message Authentication Code Protocol (CMMP) and the Temporal Key Integrity Protocol (TKIP), which may use RC4 stream cipher to dynamically generate a new key for each packet. (AES/CCMP) still uses the IV and MIC, but the IV increases after each block of cipher. In embodiments, different variations of WPA (e.g., WPA2 or WPA3) may be used. In some embodiments, WPA may mandate using TKIP, with AES being optional. In some embodiments, WPA2 may be used wherein AES is mandated and TKIP is not used. In some embodiments, WPA may allow AES in its general form. In some embodiments, WPA2 may only allow an AES/CCMP variant.

WPA may use one of two authentication modes. One mode includes an enterprise mode (or otherwise 802.1X mode) wherein authentication against a server such as a RADIUS server is required for authentication and key distribution and TKIP is used with the option of AES. The second mode includes a personal mode (e.g., popular in homes) wherein an authentication server is not used and each network device encrypts data by deriving its encryption key from a pre-shared key. In some embodiments, a network device and wireless router may agree on security capabilities at the beginning of negotiations, after which the WPA-802.1X process may begin. In some embodiments, the network device and wireless router may use a Pairwise Master Key (PMK) during a session. After this, a four-way handshake may occur. In some embodiments, the network device and an authenticator may communicate and a Pairwise Transient Key (PTK) may be derived which may confirm the PMK between the network device and the wireless router, establish a temporal key (TK) that may be used for message encryption, authenticate the negotiated parameters, and create keying material for the next phase (known as the two-way group key handshake). When the two-way group key handshake occurs, a network device and authenticator may negotiate the Group Transient Key (GTK), which may be used to decrypt broadcast and multicast transmissions. A first network device may generate a random or pseudo-random number using a random generator algorithm and may sends it to a second network device. The second network device may then use a common passphrase along with the random number to derive a key that may be used to encrypt data being sent back to the first network device. The second network device may then send its own random number to the first network device, along with a Message Integrity Code (MIC), which may be used to prevent the data from being tampered with. The first network device may then generate a key that may be used to encrypt unicast traffic to the client. To validate, the first network device may send the random number again, but encrypted using the derived key. A final message may be sent, indicating that the TK is in place on both sides. The two-way handshake that exchanges the group key may include generating a Group Master Key (GMK), usually by way of a random number. After a first network device generates the GMK, it may generate a group random number. This may be used to generate a Group Temporal Key (GTK). The GTK may provide a group key and a MIC. The GTK may change when it times out or when one of the network devices on one side leaves the network. In some embodiments, WPA2 may include key management which may allow keys to be cached, resulting in faster connections. In some embodiments, WPA may include Public Key Infrastructure to achieve higher security.

In some embodiments, vendor protocols such as EAP-FAST or LEAP may be used when the wireless router supports the protocols. In some protocols, only a server side certificate may be used to create a tunnel within which the actual authentication takes place. An example of this method includes the PEAP protocol that uses EAP MS-CHAP V2 or EAP GTC to authenticate the user inside an encrypted tunnel. In some embodiments, authentication may allow a device to be centrally authenticated and may be used to determine if the device belongs to a group of devices or if it safe for the device to join a group of devices or interact with other devices. In some embodiments, a decentralized network may be used. In some embodiments, block chain may be used to add new devices to a group of devices wherein new devices may be recorded in a leger as they join. Block chain may be used to prevent new devices from enacting any unexpected or unwanted actions.

In some embodiments, a wireless router may be compromised. In some embodiments, as a result of the wireless router being compromised, the flash file system and non-volatile random-access memory (NVRAM) may be deleted. In such instances, there may be significant downtime as the files are put back in place prior to restoring normal wireless router functionality. In some embodiments, a Cisco Resilient Configuration feature may be used to improve recovery time by generating a secure working copy of the Internetwork Operating System (IOS) image and startup configuration files (i.e., the primary boot set) that cannot be deleted by a remote user.

In some embodiments, a Simple Network Management Protocol (SNMP) may be used to manage each device (e.g., network servers, wireless routers, switches, etc.) within a network. In some embodiments, SNMP messages may be encrypted with a hash to provide integrity of the packset. In some embodiments, hashing may also be used to validate the source of an SNMP message. In some embodiments, encryptions such as Cipher Block Chaining Data Encryption Standard (CBC-DES) with a key length of 56 bits, for example, may be used to make the messages unreadable by an unauthorized party.

In some embodiments, the application used for experiencing media may include a voice command center. In some embodiments, a voice command received by a microphone of a device executing the application may be locally translated to a text command or may be sent to the cloud for analysis and translation into text. In some embodiments, a command from a set of previously known commands (or previously used commands) may be processed locally. In some embodiments, the voice command may be sent to the cloud if not understood locally. In some embodiments, speech-to-text functionality may be performed and/or validated by the backend on the cloud or locally on the device. In some embodiments, the backend component may be responsible for interpreting intent from a speech input and/or operationalizing the intent into a task. In some embodiments, a limited number of well known commands may be stored and interpreted locally. In some embodiments, a limited number of previously used commands may be stored and interpreted locally based on the previous interpretations that were executed on the cloud. In digitized audio, digital signals use numbers to represent levels of voice instead of a combination of electrical signals. For example, the process of digitizing a voice includes changing analog voice signals into a series of numbers that may be used to reassemble the voice at the receiving end. In some embodiments, a device (mobile or static) may use a numbering plan, such as the North American Numbering Plan (NANP) which uses the E.164 standard to break numbers down into country code, area code, central office or exchange code, and station code. Other methods may be used. For example, the NANP may be combined with the International Numbering Plan, which all countries abide by for worldwide communication.

In some embodiments, a device on which the application for experiencing media is executed may carry voice and/or video data. In embodiments, the average human ear may hear frequencies from 20-20,000 Hz while human speech may use frequencies from 200-9,000 Hz. Some embodiments may employ the G.711 standard, an International Telecommunications Union (ITU) standard using pulse code modulation (PCM) to sample voice signals at a frequency of 8,000 Hz. Two common types of binary conversion techniques employed in the G.711 standard include u-law (used in the United States, Canada, and Japan) and a-law (used in other locations). Some embodiments may employ the G.729 standard, an ITU standard that samples voice signals at 8,000 samples per second with bit rate fixed at 8 bits per sample and is based on Nyquist rate theorem. In embodiments, the G.729 standard uses compression to achieve more throughput as compared to the G.711 standard. In embodiments, the G.729 standard uses a conjugative-structure algebraic-code-excited liner prediction (CS-ACELP) and alternates sampling methods and algebraic expressions as a codebook to predict the actual numeric representation. Therefore, smaller algebraic expressions sent are decoded on the remote site and the audio is synthesized to resemble the original audio tones. In some cases, there may be degradation of quality associated with audio waveform prediction and synthetization. Some embodiments may employ the G.729a standard, another ITU standard that is a less complicated variation of G.729 standard as it uses a different type of algorithm to encode the voice. The G.729 and G.729a codecs are particularly optimized for human speech. In embodiments, data may be compressed down to 8 Kbps stream and the compressed codecs may be used for transmission of voice over low speed WAN links. Since codecs are optimized for speech, they often do not provide adequate quality for music streams. A better quality codec may be used for playing music or sending music or video information. In some cases, multiple codecs may be used for sending different types of data. Some embodiments may use H.323 protocol suite created by ITU for multimedia communication over network based environments. Some embodiments may employ Internet Low Bitrate Codec (ILBC), which uses either 20 ms or 30 ms voice samples that consume 15.2 Kbps or 133 Kbps, respectively. The ILBC may moderate packet loss such that a communication may carry on with little notice of the loss by the user. Some embodiments may employ internet speech audio codec which uses a sampling frequency of 1.6 kHz or 32 kHz, an adaptive and variable bit rate of 10-32 Kbps or 10-52 Kbps, an adaptive packet size 30-60 ms, and an algorithmic delay of frame size plus 3 ms. Several other codecs (including voice, music, and video codecs) may be used, such as Linear Pulse Code Modulation, Pulse-density Modulation, Pulse-amplitude Modulation, Free Lossless Audio Codec, Apple Lossless Audio Codec, monkey's audio, OptimFROG, WavPak, True Audio, Windows Media Audio Lossless, Adaptive differential pulse-code modulation, Adaptive Transform Acoustic Coding, MPEG-4 Audio, Linear predictive coding, Xvid, FFmpeg MPEG-4, and DivX Pro Codec. In some embodiments, a Mean Opinion Score (MOS) may be used to measure the quality of voice streams for each particular codec and rank the voice quality on a scale of one (worst quality) to five (excellent quality).

In some embodiments, a packet traveling from the default gateway through layer 3 may be treated differently depending on the underlying frame. For example, voice data may need to be treated with more urgency than a file transfer. Similarly, voice control data such as frames to establish and keep a voice call open may need to be treated urgently. In some embodiments, a voice may be digitized and encapsulated into IP packets to be able to travel in a data network. In some embodiments, to digitize a voice, analog voice frequencies may be sampled, turned into binary, compressed, and sent across an IP network. In the process, bandwidth may be saved in comparison to sending the analog waveform over the wire. In some embodiments, distances of voice travel may be scaled as repeaters on the way may reconstruct the attenuated signals, as opposed to analog signals that are purely electrical on the wire and may become degraded. In analog transmission of voice, the noise may build up quickly and may be retransmitted by the repeater along with the actual voice signals. After the signal is repeated several times, a considerable amount of electrical noise may accumulate and mix with the original voice signal carried. In some embodiments, after digitization, multiple voice streams may be sent in more compact form.

In some embodiment, three steps may be used to transform an analog signal (e.g., a voice command) into a compressed digital signal. In some embodiments, a first step may include sampling the analog signal. In some embodiments, the sample size and the sample frequency may depend the desired quality, wherein a larger sample size and greater sampling frequency may be used for increased quality. For example, a higher sound quality may be required for music. In some embodiments, a sample may fit into 8 bits, 16 bits, 32 bits, 64 bits, and so forth. In some cases, standard analogue telephones may distinguish sound waves from 0-4000 Hz. To mimic this this frequency range, the human voice may be sampled 8000 times per second using Harry Nyquist concept wherein the max data rate (in bits/sec) may be determined using $2 \times B \times \log_2 V$, wherein B is bandwidth and V is the number of voltage levels. Given that 4000 Hz may approximately be the highest theoretical frequency of the human voice, and that the average human voice may approximately be within the range of 200-2800 Hz, sampling a human voice 8000 times per second may reconstruct an analogue voice equivalent fairly well while using sound waves within the range of 0-299 Hz and 3301-4000 Hz for out-of-band signaling. In some embodiments, Pulse Amplitude Modulation (PAM) may be performed on a waveform to obtain a slice of the wavelength at a constant number of 8000 intervals per second. In some embodiments, a second step of converting an analog signal into a compressed digital signal may include digitization. In some embodiments, Pulse Code Modulation (PCM) may be used to digitize a voice by using quantization to encode the analog waveform into digital data for transport and decode the digital data to play it back by applying voltage pulses to a speaker mimicking the original analog voice. In some embodiments, after completing quantization, the digital data may be converted into a binary format that may be sent across a wire as a series of zeroes and ones (i.e., bits), wherein different series represent different numeric values. For example, 8000 samples per second sampling rate may be converted into an 8-bit binary number and sent via a 64 Kbps of bandwidth (i.e., 8000 samples×8 bits per sample=64000 bits). In some embodiments, a codec algorithm may be used for encoding an analog signal into digital data and decoding digital data to reproduce the analog signal. In embodiments, the quality of the encoded waveforms and the size of the encoded data stream may be different depending on the codec being used. For example, a smaller size of an encoded data stream may be preferable for a voice. Examples of codecs that may be used include u-law (used in the United States, Canada, and Japan) and a-law. In some embodiments, transcoding may be used to translate one codec into another codec. In some cases, codecs may not be compatible. In some embodiments, some resolution of the voice may be naturally lost when an analogue signal is digitized. For example, fewer bits may be used to save on the data size, however this may result in less quality. In some embodiments, a third step of converting an analog signal into a compressed digital signal may include compression. In some embodiments, compression may be used to eliminate some redundancy in the digital data and save bandwidth and computational cost. While most compression algorithms are lossy, some compression algorithms may be lossless. For example, with smaller data streams more individual data streams may be sent across the same bandwidth. In some embodiments, the compressed digital signal may be encapsulated into IP packets that may be sent in an IP network.

In some embodiments, several factors may affect transmission of voice packets. Examples of such factors may include packet count, packet delay, packet loss, and jitter (delay variations). In some embodiments, echo may be created in instances wherein digital voice streams and packets travelling from various network paths arrive out of order. In some embodiments, echo may be the repetition of sound that arrives to the listener a period of time after the original sound is heard.

In some embodiments, Session Initiation Protocol (SIP), an IETF RFC 3261 standard signaling protocol designed for management of multimedia sessions over the internet, may be used. The SIP architecture is a peer-to-peer model in theory. In some embodiments, Real-time Transport Protocol (RTP), an IETF RFC 1889 and 3050 standard for the delivery of unicast and multicast voice/video streams over an IP network using UDP for transport, may be used. UDP, unlike TCP, may be an unreliable service and may be best for voice packets as it does not have a retransmit or reorder mechanism and there is no reason to resend a missing voice signal out of order. Also, UDP does not provide any flow control or error correction. With RTP, the header information alone may include 40 bytes as the RTP header may be 12 bytes, the IP header may be 20 bytes, and the UDP header may be 8 bytes. In some embodiments, Compressed RTP (cRTP) may be used, which uses between 2-5 bytes. In some embodiments, Real-time Transport Control Protocol (RTCP) may be used with RTP to provide out-of-band monitoring for streams that are encapsulated by RTP. For example, if RTP runs on UDP port 22864, then the corresponding RTCP packets run on the next UDP port 22865. In some embodiments, RTCP may provide information about the quality of the RTP transmissions. For example, upon detecting a congestion on the remote end of the data stream, the receiver may inform the sender to use a lower-quality codec.

In some embodiments, a Voice Activity Detection (VAD) may be used to save bandwidth when voice commands are given. In some embodiments, VAD may monitor a voice conversation and may stop transmitting RTP packets across the wire upon detecting silence on the RTP stream (e.g., 35-40% of the length of the voice conversation). In some embodiments, VAD may communicate with the other end of the connection and may play a prerecorded silence packet instead of carrying silence data.

Similar to voice data, an image may be sent over the network. Similar concerns as those previously discussed for carrying voice packets exist for carrying images. In some embodiments, protocols may be used to help control packet count, packet delay, packet loss, and jitter (delay variations). In some embodiments, there may be a delay in the time it takes a packet to arrive to final destination from a source. This may be caused by lack of bandwidth or length of physical distance between locations. In some cases, multiple streams of voice and data traffic competing for a limited amount of bandwidth may cause various kinds of delays. In some embodiments, there may be a fixed delay in the time it takes the packet to arrive to the final destination. For example, it may take a certain amount of time for a packet to travel a specific geographical distance. In some embodiments, Quality of Service (QoS) may be used to request preferred treatment from the service provider for traffic that is sensitive. In some embodiments, this may reduce other kinds of delay. One of these delays may include a variable delay which is a delay that may be influenced by various factors. In some embodiments, the request may be related to how data is queued in various devices throughout a journey as it impacts the wait time in interface queues of various device. In some embodiments, changing queuing strategies may help lower variable delays, such as jitter or other variations of delay, such as packets that have different amounts of delay traveling the cloud or network. For example, a first packet of a conversation might take 120 ms to reach a destination while the second packet may take 110 ms to reach the destination.

In some embodiments, packets may be lost because of a congested or unreliable network connection. In some embodiments, particular network requirements for voice and video data may be employed. In addition to bandwidth requirements, voice and video traffic may need an end-to-end one way delay of 150 ms or less, a jitter of 30 ms or less, and a packet loss of 1% or less. In some embodiments, the bandwidth requirements depend on the type of traffic, the codec on the voice and video, etc. For example, video traffic consumes a lot more bandwidth than voice traffic.

In some embodiments, classification and marking of a packet may be used such network devices may easily identify the packet as it crosses the network. In some embodiments, a first network device that receives the packet may classify or mark the packet. In some embodiments, tools such as access controls, the source of the traffic, or inspection of data up to the application layer in the Open Systems Interconnection (OSI) model may be used to classify or mark the packet. In some cases, inspections in upper layers of the OSI model may be more computationally intensive and may add more delay to the packet. In some embodiments, packets may be labeled or marked after classification. In some embodiments, marking may occur in layer 2 of the OSI model (data link) header (thus allowing switches to read it) and/or layer 3 of the OSI model (network) header (thus allowing routers to read it). In some embodiments, after the packet is marked and as it travels through the network, network devices may read the mark of the packet to classify the packet instead of examining deep into the higher layers of the OSI model. In some embodiments, advanced machine learning algorithms may be used for traffic classification or identifying time-sensitive packets instead of manual classification or identification. In some embodiments, marking of a packet may flag the packet as a critical packet such that the rest of the network may identify the packet and provide priority to the packet over all other traffic. In some embodiments, a packet may be marked by setting a Class of Service (CoS) value in the layer 2 Ethernet frame header, the value ranging from zero to seven. The higher the CoS value, the higher priority of the packet. In some embodiments, a packet may receive a default mark when different applications are running on a device. In some embodiments, a mark of a value of zero may indicate no marking. In some embodiments, marking patterns may emerge over time as the application and device are used over time.

In some embodiments, additional hardware may be implemented to avoid congestion. In some embodiments, preemptive measures, such as dropping packets that may be non-essential (or not as essential) traffic to the network, may be implemented to avoid heavy congestion. In some embodiments, a packet that may be dropped may be determined when there is congestion and bandwidth available. In some embodiments, the dropping excess traffic may be known as policing. In some embodiments, shaping queues excess traffic may be employed wherein packets may be sent at a later time or slowly.

In some embodiments, metadata (e.g., keywords, tags, descriptions) associated with voice data may be used to search for voice data within a large database. In some embodiments, a vector space model used for representing and searching text documents may be applied to voice data. In some embodiments, text documents may be represented with vectors that are histograms of word frequencies within the text. In some embodiments, a histogram vector of a text document may include the number of occurrences of every word within the document. In some embodiments, common words (e.g., the, is, a, etc.) may be ignored. In some embodiments, histogram vectors may be normalized to unit length by dividing the histogram vector by the total histogram sum since documents may be of different lengths. In some embodiments, the individual components of the histogram vector may be weighted based on the importance of each word. In some embodiments, the importance of the word may be proportional to the number of times it appears in the document or otherwise the term frequency of the word. In some embodiments, the term frequency ($tf_{w,d}$) of a word (w) in a document (d) may be determined using $$tf_{w,d} = \frac{n_w}{\sum_j n_j},$$

wherein $n_w$ is the raw count of a word and $\sum_j n_j$ is the number of words in the document. In some embodiments, the inverse document frequency ($idf_{w,d}$) may be determined using $$idf_{w,d} = \log \frac{|D|}{|\{d:w \in d\}|},$$

wherein |D| is the number of documents in the corpus D and |{d:w∈d}| is the number of documents in the corpus that include the particular word. In some embodiments, the term frequency and the inverse document frequency may be multiplied to obtain one of the elements of the histogram vector. In some embodiments, the vector space model may be applied to voice data by generating words that may be included in the voice data. In some embodiments, a database may be set up and voice data may be indexed by extracting word descriptors and storing the words and word histograms with the corresponding voice information to which they belong. In some embodiments, pre-existing applications that may convert voice data into text data may be used. In some embodiments, such applications may use neural networks in transcribing voice data to text data and may transcribe voice data in real-time or voice data saved in a file. In some embodiments, a query of particular voice data sent to a database of voice data may return a result after searching the database. In some embodiments, Structured Query Language (SQL) may be used to execute a query. In some embodiments, larger databases may provide better results. In some embodiments, the database may be stored on the cloud. In some embodiments, similar searching techniques as described above may be used for audio data.

In some embodiments, data may travel through a wired network or a wireless network. In some embodiments, the transmission of data may begin by an Alternate Current (AC) signal generated by a transmitter. In some embodiments, the AC signal may be transmitted to an antenna of a device, wherein the AC signal may be radiated as a sine wave. During this process, current may change the electromagnetic field around the antenna such that it may transmit electromagnetic waves or signals. In embodiments, the electric field may be generated by stationary charges or current and magnetic field is perpendicular to the electric field. In embodiments, the magnetic field may be generated at the same time as the electric field, however, the magnetic field is generated by moving charges. In embodiments, electromagnetic waves may be created as a result of oscillation between an electric field and a magnetic field, forming when the electric field comes into contact with the magnetic field. In embodiments, the electric field and magnetic field are perpendicular to the direction of the electromagnetic wave. In embodiments, the highest point of a wave is a crest while the lowest point is a trough.

In some embodiments, the polarization of an electromagnetic wave describes the way the electromagnetic wave moves. In embodiments, there are three types of polarization, vertical, horizontal, and circular. With vertical polarization waves move up and down in a linear way. With horizontal polarization waves move left and right in a linear way. With circular polarization waves circle as they move forward. For example, some antennas may be vertically polarized in a wireless network and therefore their electric field is vertical. In embodiments, determining the direction of the propagation of signals from an antenna is important as malalignment may result in degraded signals. In some embodiments, an antenna may adjust its orientation mechanically by a motor or set of motors or a user may adjust the orientation of the antenna.

In some embodiments, two or more antennas on a wireless device may be used to avoid or reduce multipath issues. In some embodiments, two antennas may be placed one wavelength apart. In some embodiments, when the wireless device hears the preamble of a frame, it may compare the signal of the two antennas and use an algorithm to determine which antenna has the better signal. In some embodiments, both signal streams may be used and combined into one signal using advanced signal processing systems. In some embodiments, the antenna chosen may be used to receive the actual data. Since there is no real data during the preamble, switching the antennas does not impact the data if the system does not have the ability to interpret two streams of incoming data.

In embodiments, there are two main types of antennas, directional and omnidirectional, the two antennas differing based on how the beam is focused. In embodiments, the angles of coverage are fixed with each antenna. For example, signals of an omnidirectional antenna from the perspective of the top plane (H-plane) may be observed to propagate evenly in a 360-degree pattern, whereas the signals do not propagate evenly from the perspective of the elevation plane (E-plane). In some embodiments, signals may be related to each plane. In some embodiments, a high-gain antenna may be used to focus a beam.

In embodiments, different waveforms may have different wavelengths, wherein the wavelength is the distance between successive crests of a wave or from one point in a cycle to a next point in the cycle. For example, the wavelength of AM radio waveforms may be 400-500 m, wireless LAN waveforms may be a few centimeters, and satellite waveforms may be approximately 1 mm. In embodiments, different waveforms may have different amplitudes, wherein the amplitude is the vertical distance between two crests in the wave (i.e., the peak and trough) and represents the strength of energy put into the signal. In some cases, different amplitudes may exist for the same wavelength and frequency. In some embodiments, some of the energy sent to an antenna for radiation may be lost in a cable existing between the location in which modulation of the energy occurs and the antenna. In some embodiments, the antenna may add a gain by increasing the level of energy to compensate for the loss. In some embodiments, the amount of gain depends on the type of antenna and regulations set by FCC and ETSI for power radiation by antennas. In some embodiments, a radiated signal may naturally weaken as it travels away from the source. In some embodiments, positioning a receiving device closer to a transmitting device may result in a better and more powerful received signal. For example, receivers placed outside of a range of an access point may not receive wireless signals from the access point, thereby preventing the network from functioning. In some embodiments, increasing the amplitude of the signal may increase the distance a wave may travel.

In some embodiments, as data travels over the air, some influences may stop the wireless signal from propagating or may shorten the distance the data may travel before becoming unusable. In some cases, absorption may affect a wireless signal transmission. For instance, obstacles, walls, humans, ceiling, carpet, etc. may all absorb signals. Absorption of a wave may create heat and reduce the distance the wave may travel, however is unlikely to have significant effect on the wavelength or frequency of the wave. To avoid or reduce the effect of absorption, wireless repeaters may be placed within an empty area, however, because of absorbers such as carpet and people, there may be a need for more amplitude or a reduction in distance between repeaters. In some cases, reflection may affect a wireless signal transmission. Reflection may occur when a signal bounces off of an object and travels in a different direction. In some embodiments, reflection may be correlated with frequency, wherein some frequencies may be more tolerant to reflection. In some embodiments, a challenge may occur when portions of signals are reflected, resulting in the signals arriving out of order at the receiver or the receiver receiving the same portion of a signal several times. In some cases, reflections may cause signals to become out of phase and the signals may cancel each other out. In some embodiments, diffraction may affect a wireless signal transmission. Diffraction may occur when the signal bends and spreads around an obstacle. It may be most pronounced when a wave strikes an object with a size comparable to its own wavelength. In some embodiments, refraction may affect a wireless signal transmission. Refraction may occur when the signal changes direction (i.e., bends) as the signal passes through matter with different density. In some cases, this may occur when wireless signals encounter dust particles in the air or water.

In some embodiments, obstructions may affect a wireless signal transmission. As signals travel to a receiver they may encounter various obstructions, as wireless signals travelling further distances widen near the midpoint and slim down closer to the receiver. Even in a visual line of sight (LOS), earth curvature, mountains, trees, grass, and pollution, may interfere with the signal when the distance is long. This may also occur for multiple wireless communicating devices positioned within a home or in a city. A device may use the wireless network or may create an ad hoc connection when in the visual LOS. Some embodiments may use Fresnel zone, a confocal prolate ellipsoidal shaped region of space between and around a transmitter and receiver. In some embodiments, the size of the Fresnel zone at any particular distance from the transmitter and receiver may help in predicting whether obstructions or discontinuities along the path of the transmission may cause significant interference. In some embodiments, a lack of bandwidth may affect a wireless signal transmission. In some cases, there may be difficulty in transmitting an amount of data required in a timely fashion when there is a lack of bandwidth. In some embodiments, header compression may be used to save on bandwidth. Some traffic (such as voice over IP) may have a small amount of application data in each packet but may send many packets overall. In this case, the amount of header information may consume more bandwidth than the data itself. Header compression may be used to eliminate redundant fields in the header of packets and hence save on bandwidth. In some embodiments, link speeds may affect a wireless signal transmission. For example, slower link speeds may have a significant impact on end-to-end delay due to the serialization process (the amount of time it takes the router to put the packet from its memory buffers onto the wire), wherein the larger the packet, the longer the serialization delay. In some embodiments, payload compression may be used to compress application data transmitted over the network such the router transmits less data across a slow WAN link.

In some embodiments, received signal strength indicator (RSSI) may be used to determine the power in a received radio signal or received channel power indicator (RCPI) may be used to determine the received RF power in a channel covering the entire received frame, with defined absolute levels of accuracy and resolution. For example, the 802.11 IEEE standard employs RSSI or RCPI. In some embodiments, signal-to-noise ratio (SNR) may be used to determine the strength of the signal compared to the surrounding noise corrupting the signal. In some embodiments, link budget may be used to determine the power required to transmit a signal that when reached at the receiving end may still be understood. In embodiments, link budget may account for all the gains and losses between a sender and a receiver, including attenuation, antenna gain, and other miscellaneous losses that may occur. For example, link budget may be determined using Received Power (dBm) =Transmitted Power (dBm)+Gains (dB)−Losses (dB).

In some embodiments, data may undergo a process prior to leaving an antenna of a device. In some embodiments, a modulation technique, such as Frequency Modulation (FM) or Amplitude Modulation (AM), used in encoding data, may be used to place data on RF carrier signals. In some cases, frequency bands may be reserved for particular purposes. For example, ISM (Industry, Scientific, and Medical) frequency bands are radio bands from the RF spectrum that are reserved for purposes other than telecommunications.

In embodiments, different applications may use different bandwidths, wherein a bandwidth in a wireless network may be a number of cycles per second (e.g., in Hertz or Hz). For example, a low quality radio station may use a 3 kHz frequency range, a high quality FM radio station may use 175 kHz frequency range, and a television signal, which sends both voice and video data over the air, may use 4500 kHz frequency range. In some embodiments, Extremely Low Frequency (ELF) may be a frequency range between 3-30 Hz, Extremely High Frequency (EHF) may be a frequency range between 30-300 GHz, and WLANs operating in an Ultra High Frequency (UHF) or Super High Frequency (SHF) may have a frequency range of 900 MHz, 2.4 GHz, or 5 GHz. In embodiments, different standards may use different bandwidths. For example, the 802.11, 802.11b, 802.11g, and 802.11n IEEE standards use 2.4 GHz frequency range. In some embodiments, wireless LANs may use and divide the 2.4 GHz frequency range into channels ranging from 2.4000-2.4835 GHz. In the United States, the United States standard allows 11 channels, with each channel being 22 MHz wide. In some embodiments, a channel may overlap with another channel and cause interference. For this reason, channels 1, 6, and 11 are most commonly used as they do not overlap. In some embodiments, a device may be configured to choose one of channel 1, 6, or 11. In some embodiments, the 5 GHz frequency range may be divided into channels, with each channel being 20 MHz wide. Based on the 802.11a and 802.11n IEEE standards, a total of 23 non-overlapping channels exist in the 5 GHz frequency.

In embodiments, different frequency ranges may use different modulation techniques that may provide different data rates. A modulated waveform may consist of amplitude, phase, and frequency which may correspond to volume of the signal, the timing of the signal between peaks, and the pitch of the signal. Examples of modulation techniques may include direct sequence spread spectrum (DSSS), Orthogonal Frequency Division Multiplexing (OFDM), and Multiple-Input Multiple-Output (MIMO). For example, 2.4 GHz frequency range may use DSSS modulation which may provide data rates of 1, 2, 5.5, and 11 Mbps and 5 GHz frequency range may use OFDM which may provide data rates of 6, 9, 12, 18, 24, 36, 48, and 54 Mbps. Devices operating within the 2.5 GHz range may use DSSS modulation technique to transmit data. In some embodiments, the transmitted data may be spread across the entire frequency spectrum being used. For example, an access point transmitting on channel 1 may spread the carrier signal across the 22 MHz-wide channel ranging from 2.401-2.423 GHz. In some embodiments, DSSS modulation technique may encode data (i.e., transform data from one format to another) using a chip sequence because of the possible noise interference with wireless transmission. In some embodiments, DSSS modulation technique may transmit a single data bit as a string of chips or a chip stream spread across the frequency range. With redundant data being transmitted, it is likely that the transmitted data is understood despite some of the signal being lost to noise. In some embodiments, transmitted signals may be modulated over the airwaves and the receiving end may decode this chip sequence back to the originally transmitted data. Because of interference, it is possible that some of the bits in the chip sequence may be lost or inverted (e.g., 1 may become 0 or 0 may become 1). However, with DSSS modulation technique, more than five bits need to be inverted to change the value of a bit from 1 to 0. Because of this, using a chipping sequence may provide networks with added resilience against interference.

In some embodiments, DSSS modulation technique may use Barker code. For example, the 802.11 IEEE standard uses an 11 chip Barker code 10110111000 to achieve rates of 1 and 2 Mbps. In embodiments, a Barker code may be a finite sequence of N values a of +1 and −1. In some embodiments, values $a_j$ for j=1, 2, . . . , N may have off-peak autocorrelation coefficients $$c_v = \sum_{j=1}^{N-v} a_j a_{j+v}.$$

In some embodiments, the autocorrelation coefficients are as small as possible, wherein $|c_v| \leq 1$ for all $1 \leq v < N$. In embodiments, sequences may be chosen for their spectral properties and low cross correlation with other sequences that may interfere. The value of the autocorrelation coefficient for the Barker sequence may be 0 or −1 at all offsets except zero, where it is +11. The Barker code may be used for lower data rates, such as 1, 2, 5.5, and 11 Mbps. In some embodiments, the DSSS modulation technique may use a different coding method to achieve higher data rates, such as 5.5 and 11 Mbps. In some embodiments, DSSS modulation technique may use Complementary Code Keying (CCK). In embodiments, CCK uses a series of codes, or otherwise complementary sequences. In some embodiments, CCK may use 64 unique code words, wherein up to six bits may be represented by a code word. In some embodiments, CCK may transmit data in symbols of eight chips, wherein each chip is a complex quadrature phase-shift keying bit-pair at a chip rate of 11 Mchips/s. In 5.5 Mbit/s and 11 Mbit/s, four and eight bits, respectively, may be modulated onto the eight chips $c_0, \ldots, c_7$, wherein $c=(c_0, \ldots, c_7)=(e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}, e^{j(\phi_1+\phi_3)}, e^{j(\phi_1+\phi_3)}, -e^{j(\phi_1+\phi_2)}, e^{j(\phi_1)})$ and phase change $\phi_1, \ldots, \phi_4$ may be determined by the bits being modulated. Since $\phi_1$ is applied to every chip, $\phi_2$ is applied to even chips, $\phi_3$ is applied the first two of every four chips, and $\phi_4$ is applied to the first four of eight chips, CCK may be generalized Hadamard transform encoding. In some embodiments, DSSS modulation technique may use Mary Orthogonal Keying which uses polyphase complementary codes or other encoding methods.

In some embodiments, after encoding the data (e.g., transforming an RF signal to a sequence of ones and zeroes), the data may be transmitted or modulated out of a radio antenna of a device. In embodiments, modulation may include manipulation of the RF signal, such as amplitude modulation, frequency modulation, and phase-shift keying (PSK). In some embodiments, the data transmitted may be based on the amplitude of the signal. For example, in amplitude modulation, +3V may be represented by a value of 1V and −3V may be represented by a value of 0. In some embodiments, the amplitude of a signal may be altered during transmission due to noise or other factors which may influence the data transmitted. For this reason, amplitude modulation may not be a reliable solution for transmitting data. Factors such as frequency and phase are less likely to be altered due to external factors. In some embodiments, Phase-Shift Keying (PSK) may be used to convey data by changing the phase of the signal. In embodiments, a phase shift is the difference between two waveforms at the same frequency. For example, two waveforms that peak at the same time are in phase and peak at different times are out of phase. In some embodiments, binary phase-shift keying (BPSK) and quadrature phase-shift keying (QPSK) modulation may be used, as in 802.11b IEEE standard. In BPSK, two phases separated by 180 degrees may be used, wherein a phase shift of 180 degrees may be represented by a value of 1 and a phase shift of 0 degrees may be represented by a value of 0. In some embodiments, BPSK may encode one bit per symbol, which is a slower rate compared to QPSK. QPSK may encode 2 bits per symbol which doubles the rate while staying within the same bandwidth. In some embodiments, QPSK may be used with Barker encoding at a 2 Mbps data rate. In some embodiments, QPSK may be used with CCK-16 encoding at a 5.5 Mbps rate. In some embodiments, QPSK may be used with CCK-128 encoding at a 11 Mbps rate.

As an alternative to DSSS, orthogonal frequency-division multiplexing (OFDM) modulation technique may be used in wireless networks. In embodiments, OFDM modulation technique may be used to achieve very high data rates with reliable resistance to interference. In some embodiments, a number of channels within a frequency range may be defined, each channel being 20 MHz wide. In some embodiments, each channel may be further divided into a larger number of small-bandwidth subcarriers, each being 300 kHz wide, resulting in 52 subcarriers per channel. While the subcarriers may have a low data rate in embodiments, the data may be sent simultaneously over the subcarriers in parallel. In some embodiments, coded OFDM (COFDM) may be used, wherein forward error correction (i.e., convolutional coding) and time and frequency interleaving may be applied to the signal being transmitted. In some embodiments, this may overcome errors in mobile communication channels affected by multipath propagation and Doppler effects. In some embodiments, numerous closely spaced orthogonal subcarrier signals with overlapping spectra may be transmitted to carry data. In some embodiments, demodulation (i.e., the process of extracting the original signal prior to modulation) may be based on fast Fourier transform (FFT) algorithms. For complex numbers $x_0, \ldots, x_{N-1}$, the discrete Fourier transform (DFM) may be $$X_k = \sum_{n=0}^{N-1} x_n e^{-\frac{i2\pi kn}{N}}$$

for k=0, ..., N−1, wherein $$e^{-\frac{i2\pi}{N}}$$

is a primitive nth root of 1. In some embodiments, the DFM may be determined using $O(N^2)$ operations, wherein there are N outputs $X_k$, and each output has a sum of N terms. In embodiments, a FFT may be any method that may determine the DFM using O(N log N) operations, thereby providing a more efficient method. For example, for complex multiplications and additions for N=4096 data points, evaluating the DFT sum directly involves $N^2$ complex multiplications and N(N−1) complex additions (after eliminating trivial operations (e.g., multiplications by 1)). In contrast, the Cooley-Tukey FFT algorithm may reach the same result with only $$\left(\frac{N}{2}\right)\log_2 N$$

complex multiplications and N $\log_2$ N complex additions. Other examples of FFT algorithms that may be used include Prime-factor FFT algorithm, Bruun's FFT algorithm, Rader's FFT algorithm, Bluestein's FFT algorithm, and Hexagonal FFT.

In some embodiments, multiple input multiple output (MIMO) modulation technique may be used. In some embodiments, the advanced signal processing allows data to be recovered after being transmitted on two or more spatial streams with more than 100 Mbps by multiplexing data streams simultaneously in one channel. For example, MIMO modulation technique may use two, three, or more antennas for receiving signals for advanced signal processing.

Some embodiments may employ dynamic rate shifting (DRS) (e.g., 802.11b, 802.11g, and 802.11a IEEE standards). In some embodiments, devices operating in the 2.4 GHz range may rate-shift from 11 Mbps to 5.5 Mbps and, in some circumstances, to 2 Mbps and 1 Mbps. In some embodiments, rate shifting occurs without dropping the connection and on a transmission-by-transmission basis. For example, a shift from 11 Mbps to 5.5 Mbps may shift back up to 11 Mbps for the next transmission. In all deployments, DRS may support multiple clients operating at multiple data rates.

In some embodiments, data collisions may occur, such as in the case of a work group of wireless devices. In some embodiments, two antennas may be used to listen for a jammed signal when a collision occurs, wherein one antenna may be used for transmitted data while the other antenna may be used for listening for a jammed signal.

In some embodiments, carrier sense multiple access collision avoidance (CSMA/CA) may be used to avoid data collisions. In such embodiments, a device may use an antenna to first listen prior to transmitting data to avoid data collision. If the channel is idle, the device may transmit a signal informing other devices to refrain from transmitting data as the device is going to transmit data. The device may use the antenna to listen again for a period of time prior to transmitting the data. Alternatively, request to send (RTS) and clear to send (CTS) packets may be used to avoid data collisions. The device transmitting data may transmit an RTS packet prior to transmitting the data and the intended receiver may transmit a CTS packet to the device. This may alert other devices to refrain from transmitting data for a period of time. In some embodiments, a RTS frame may include five fields: frame control, duration, receiver address (RA), transmitter address (TA), and Frame Check Sequence (FCS). In some embodiments, a CTS frame may include four fields: frame control, duration, RA, and FCS. In some embodiments, the RA may indicate the MAC address of the device receiving the frame and TA may indicate the MAC address of the device that transmitted the frame. In some embodiments, FCS may use the cyclic redundancy check (CRC) algorithm.

In embodiments, information is not disclosed to unauthorized individuals; groups, processes, or devices. In embodiments, highly confidential data is encrypted such third parties may not easily decrypt the data. In embodiments, impersonation is impossible. For example, a third party is unable to insert unauthentic data in replacement of real data. In embodiments, security begins at the data collection level. In embodiments, information processed is inaccessible by a third party. In embodiments, executable code are not retrievable from a stored location (e.g., server or cloud) and are sealed and secured. In some embodiments, encryption mechanisms may be used. In embodiments, permission from the user is required when all or a part of data is sent to the cloud. In embodiments, permission from the user is recorded and stored for future references. In embodiments, the method of obtaining permission from the user is such a third party, including the manufacturer, cannot fabricate a permission on behalf of the user. In some embodiments, a transmission channel may be encrypted to prohibit a third party from eavesdropping. In embodiments, data must remain secure in the cloud. In some embodiments, only an authorized party may decrypt the encrypted information. In some embodiments, data may be encrypted with either symmetric or asymmetric methods or hashing. Some embodiments may use a secret key or public-private key. In some embodiments, communication may be connection based (e.g., TCP) or connectionless (e.g., UDP). For time-sensitive information, UDP may be used. For communication that requires receipt at the other side, TCP may be used. In some embodiments, other encryption frameworks such as IPsec and Layer Two Tunneling Protocol (L2TP) may be used. In some embodiments, information may be marked as acceptable and set as protected by the user. In some embodiments, the user may change a protection setting of the information to unprotected using the application.

Some embodiments include methods and techniques for virtual spatial reality (VR) and augmented spatial reality (AR). In some embodiments, a spatial representation of an environment may be regenerated. In some embodiments, the spatial representation is initially generated by a processor of a robot or other device using simultaneous localization and mapping (SLAM) techniques. In some cases, a user may wear a wearable headset which may display a virtual representation of the environment to the user. In one example, a user may use virtual spatial reality to view an environment with or without particular objects. For instance, for a virtual home, a user may want to view a room with or without various furniture, appliances, and decoration. In another example, a virtual spatial reality representation of an inside of a home of a customer may be used in a furniture and appliance store to virtually show the customer advertised items, such as furniture and appliances, within their home. This may be expanded to various other applications. In some embodiments, a virtual spatial reality may be used for games. For example, a virtual or augmented spatial reality of a room moves at a walking speed of a user experiencing the virtual spatial reality using a wearable headset. In some embodiments, the walking speed of the user may be determined using a pedometer worn by the user. In some embodiments, a virtual spatial reality may be created and later implemented in a game wherein the virtual spatial reality moves based on a displacement of a user measured using a SLAM device worn by the user. In some instances, a SLAM device may be more accurate than a pedometer as pedometer errors are adjusted with scans. In some cases, the SLAM device is included in the wearable headset. In some current virtual reality games a user may need to use an additional component, such as a chair synchronized with the game (e.g., moving to imitate the feeling of riding a roller coaster), to have a more realistic experience. In the virtual spatial reality described herein, a user may control where they go within the virtual spatial reality (e.g., left, right, up, down, remain still). In some embodiments, the movement of the user measured using a SLAM device worn by the user may determine the response of a virtual spatial reality video seen by the user. For example, if a user runs, a video of the virtual spatial reality may play faster. If the user turns right, the video of the virtual spatial reality shows the areas to the right of the user. Using a virtual reality wearable headset, the user may observe their surroundings within the virtual space, which changes based on the speed and direction of movement of the user. This is possible as the system continuously localizes a virtual avatar of the user within the virtual map according to their speed and direction of movement. This concept may be useful for video games, architectural visualization, or the exploration of any virtual space.

Figure 4A:
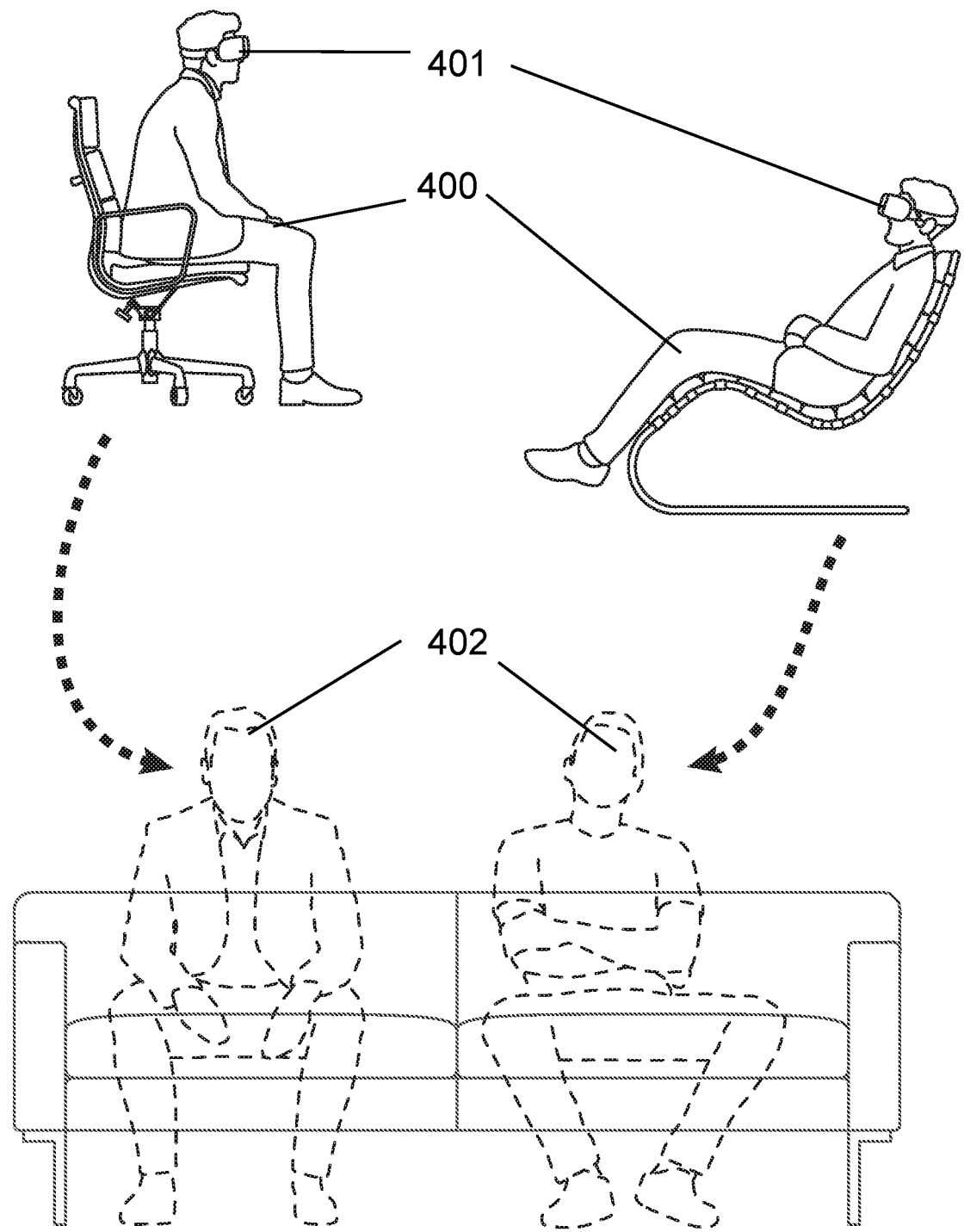
FIGS. 4A-4C and 5A-5C illustrate examples of virtual reality and augmented reality, according to some embodiments.
Figure 4B:
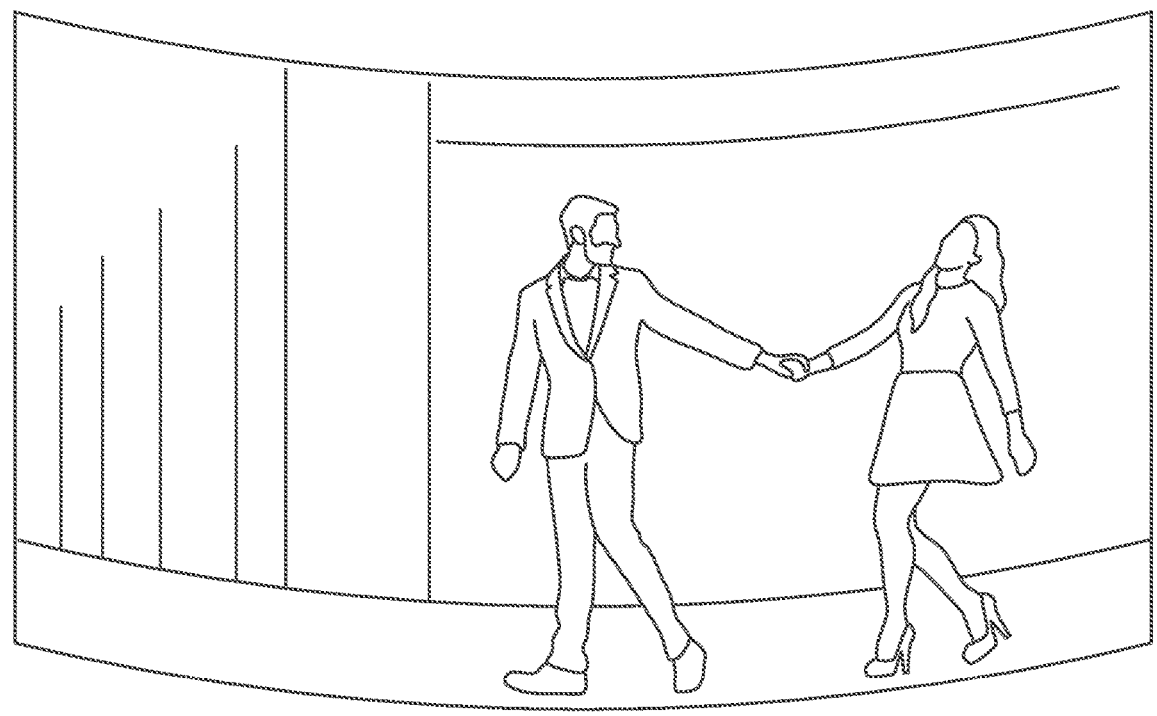
Figure 4B:
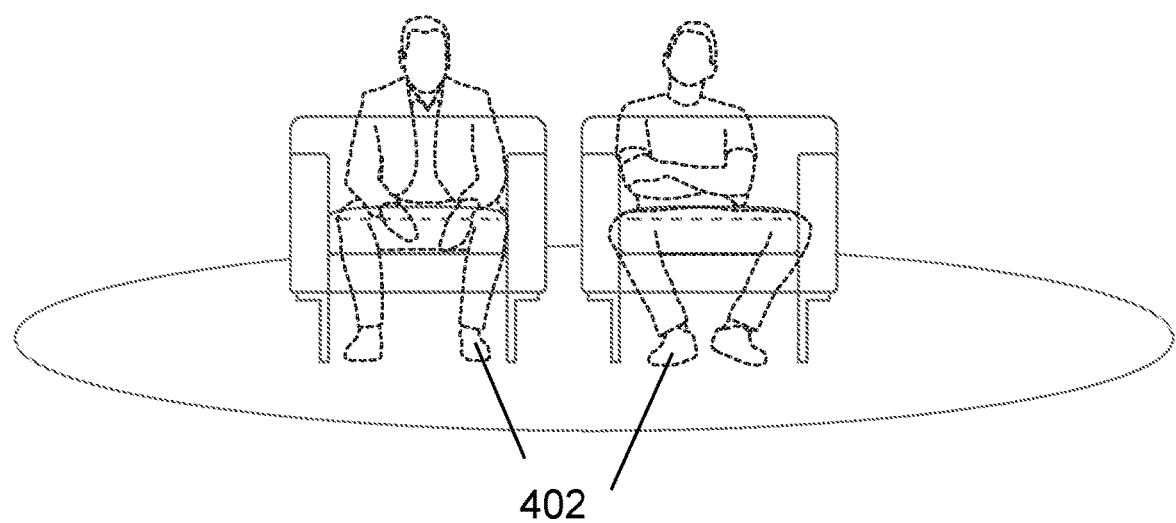
Figure 4C:
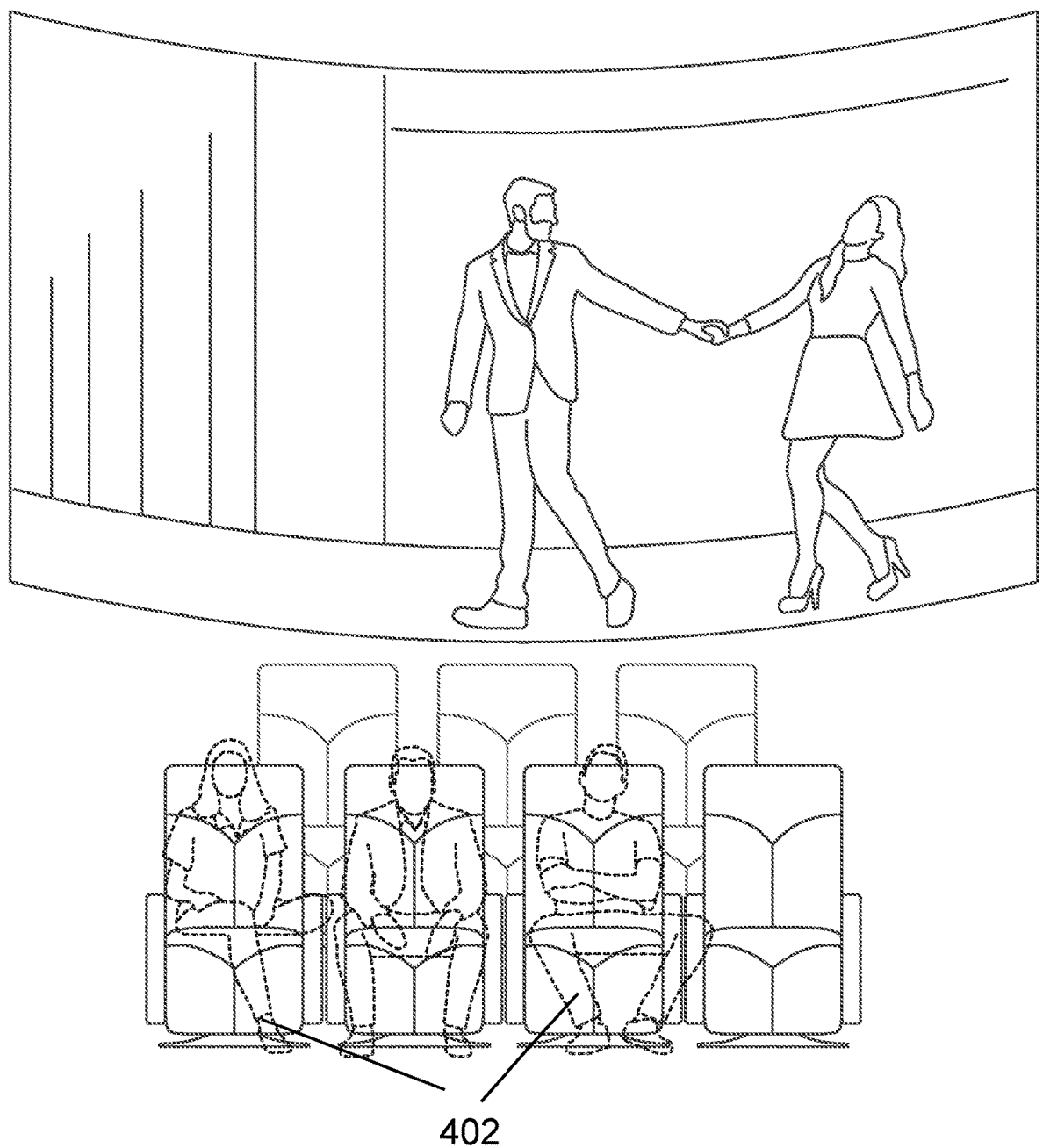
Figure 5A:
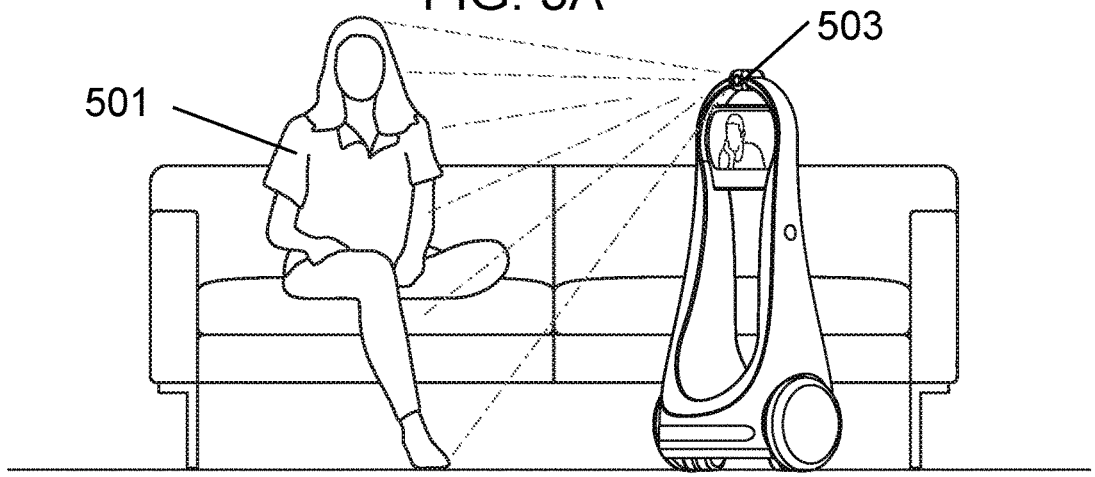
Figure 5A:
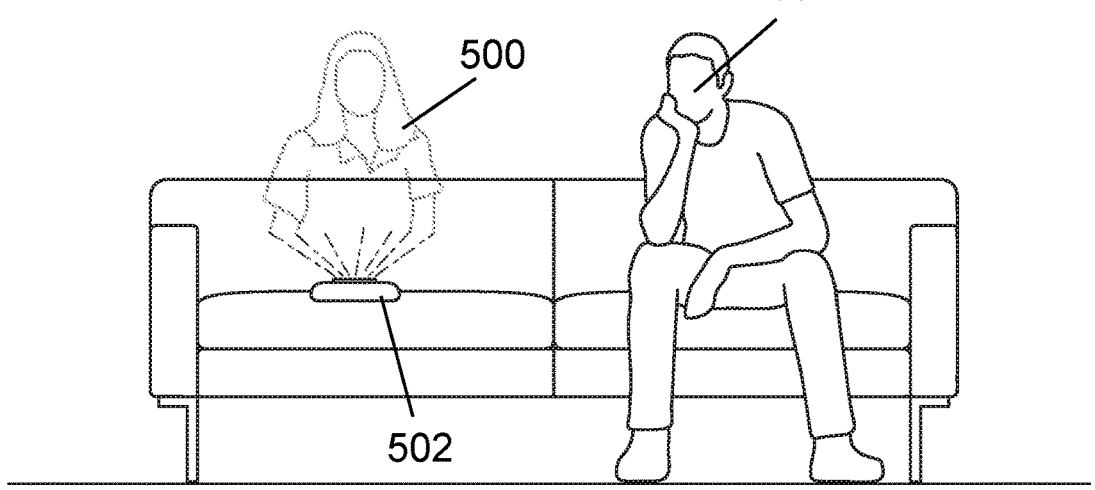
Figure 5B:
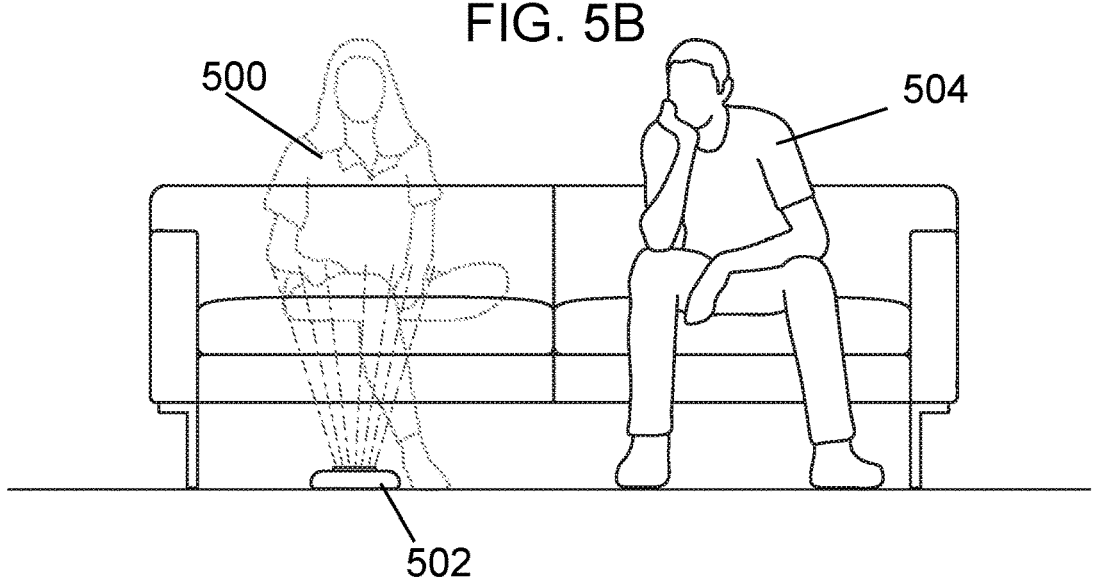
Figure 5C:
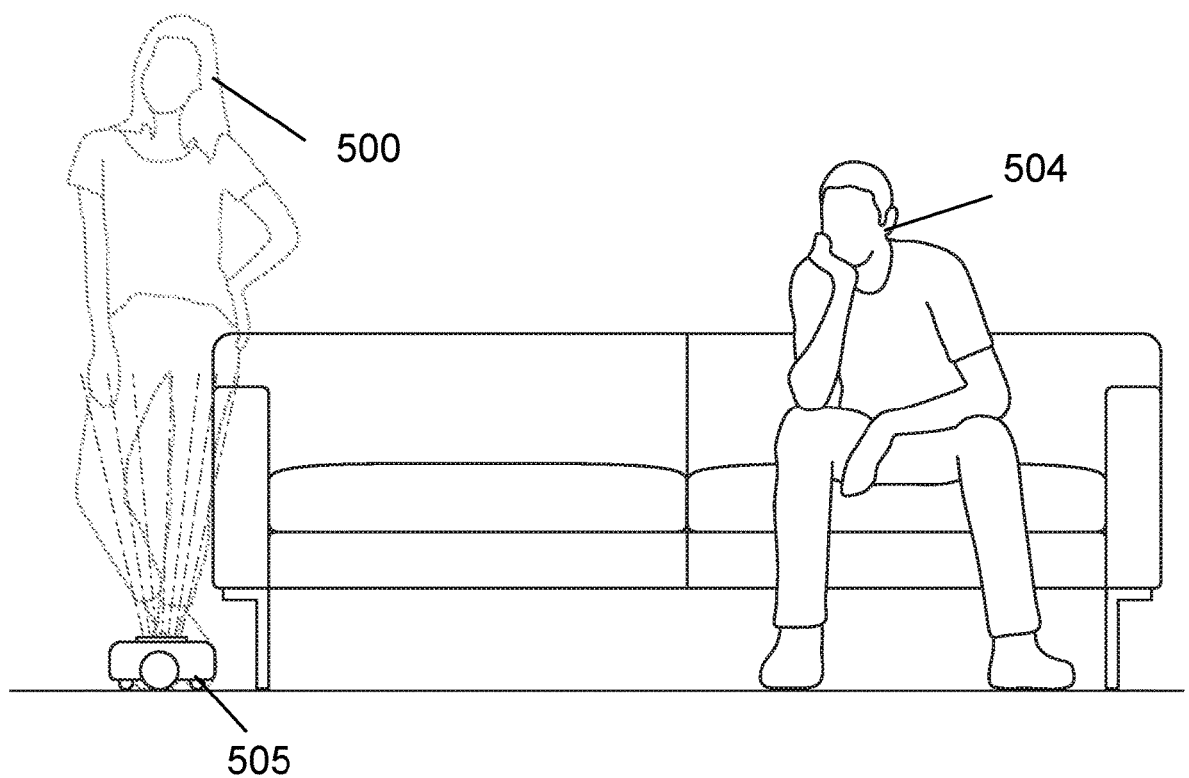

In some embodiments, VR wearable headsets may be connected, such that multiple users may interact with one another within a common VR experience. For example, FIG. 4A illustrates two users 400, each wearing a VR wearable headset 401. The VR wearable headsets 401 may be wirelessly connected such that the two users 400 may interact in a common virtual space (e.g., Greece, Ireland, an amusement park, theater, etc.) through their avatars 402. In some cases, the users may be located in separate locations (e.g., at their own homes) but may still interact with one another in a common virtual space. FIG. 4B illustrates an example of avatars 402 hanging out in a virtual theater. Since the space is virtual, it may be customized based on the desires of the users (e.g., outdoor scene, rainy scene, a historical landmark, a museum, etc.). For instance, FIG. 4C illustrates a classic seating area for a theater that may be chosen to customize the virtual theater space. In embodiments, robots, cameras, wearable technologies, and motion sensors may determine changes in location and expression of the user. This may be used in mimicking the real actions of the user by an avatar in virtual space. For example, FIG. 5A illustrates a virtual reconstruction 500 of a user 501 through VR base 502 based on sensor data captured by at least the camera 503 of the robot (similar to the robot described in FIGS. 3A and 3B). A user 504 may then enjoy the presence of user 501 without them having to physically be there. The VR base 502 may be positioned anywhere, as illustrated in FIG. 5B wherein the VR base 502 is positioned on the floor. In some cases, the VR base may be robotic. FIG. 5C illustrates a robotic VR base 505 that may follow user 504 around the house such that they may continue to interact with the virtual reconstruction 500 of the user 501. The robotic VR base 505 may use SLAM to navigate around the environment.

In some embodiments, a SLAM enabled device (e.g., robot, smart watch, cell phone, smart glasses, etc.) may collect environmental sensor data and generate maps of the environment. In some embodiments, the environmental sensor data as well as the maps may be overlaid on top of an augmented reality representation of the environment, such as a video feed captured by a video sensor of the SLAM enabled device or another device all together. In some embodiments, the SLAM enabled device may be wearable (e.g., by a human, pet, robot, etc.) and may map the environment as the device is moved within the environment. In some embodiments, the SLAM enabled device may simultaneously transmit the map as its being built and useful environmental information as its being collect for overlay on the video feed of a camera. In some cases, the camera may be a camera of a different device or of the SLAM enabled device itself. For example, this capability may be useful in situations such as natural disaster aftermaths (e.g., earthquakes or hurricanes) where first responders may be provided environmental information such as area maps, temperature maps, oxygen level maps, etc. on their phone or headset camera. Examples of other use cases may include situations handled by police or fire fighting forces. For instance, an autonomous robot may be used to enter a dangerous environment to collect environmental data such as area maps, temperature maps, obstacle maps, etc. that may be overlaid with a video feed of a camera of the robot or a camera of another device. In some cases, the environmental data overlaid on the video feed may be transmitted to a communication device (e.g., of a police or fire fighter for analysis of the situation). Another example of a use case includes the mining industry as SLAM enabled devices are not required to rely on light to observe the environment. For example, a SLAM enabled device may generate a map using sensors such as LIDAR and sonar sensors that are functional in low lighting and may transmit the sensor data for overlay on a video feed of camera of a miner or construction worker. In some embodiments, a SLAM enabled device, such as a robot, may observe an environment and may simultaneously transmit a live video feed of its camera to an application of a communication device of a user. In some embodiments, the user may annotate directly on the video to guide the robot using the application. In some embodiments, the user may share the information with other users using the application. Since the SLAM enabled device uses SLAM to map the environment, in some embodiments, the processor of the SLAM enabled device may determine the location of newly added information within the map and display it in the correct location on the video feed. In some cases, the advantage of combined SLAM and AR is the combined information obtained from the video feed of the camera and the environmental sensor data and maps. For example, in AR, information may appear as an overlay of a video feed by tracking objects within the camera frame. However, as soon as the objects move beyond the camera frame, the tracking points of the objects and hence information on their location are lost. With combined SLAM and AR, location of objects observed by the camera may be saved within the map generated using SLAM techniques. This may be helpful in situations where areas may be off-limits, such as in construction sites. For example, a user may insert an off-limit area in a live video feed using an application displaying the live video feed. The off-limit area may then be saved to a map of the environment such that its position is known. In another example, a civil engineer may remotely insert notes associated with different areas of the environment as they are shown on the live video feed. These notes may be associated with the different areas on a corresponding map and may be accessed at a later time. In one example, a remote technician may draw circles to point out different components of a machine on a video feed from an onsite camera through an application and the onsite user may view the circles as overlays in 3D space. In some embodiments, based on SLAM data and/or map and other data sets, a processor may overlay various equipment and facilities related to the environment based on points of interest (e.g., electrical layout of a room or building, plumbing layout of a room or building, framing of a room or building, air flow circulation or temperature in a room or building, etc.

The foregoing descriptions of specific embodiments of the invention have been presented for purposes of illustration and description. They are not intended to be exhaustive or to limit the invention to the precise forms disclosed.

The invention claimed is:

1. A method for synchronizing at least two devices, comprising:
   connecting the at least two devices using art application executed on each of the at least two devices, wherein:
      a same media is executed in synchronization by the at least two devices using the application;
      an input received by the application executed on a first device of the at least two devices actuates a same response on the at least two devices; and
      the application is configured to, based on user input, create a schedule for experiencing a media, invite at least one user to experience a media immediately or at a schedule time, invite at least one user to dance to a media immediately or at a schedule time, invite at least one user to a live or virtual sporting or gaming event, order a food or beverage and actuate delivery of the food or beverage to a location, add a scheduled media to a calendar, suggest an alternate schedule in response to an invitation to experience a media, create a video chat, create a text chat, create a favorites list, and share a favorites list.

2. The method of claim 1, wherein the media comprises any of video, audio, and a virtual reality simulation.

3. The method of claim 1, wherein the response comprises any of an instruction to play the media, an instruction to pause the media, an instruction to rewind the media, and an instruction to fast forward the media.

4. The method of claim 3, wherein commercials are played throughout at least a portion of a time the media is paused or commercials are played prior to playing the media such that the media is experienced commercial free.

5. The method of claim 1, wherein an input received by the application executed on a second device of the at least two devices overrides the input received by the application executed on the first device and prevents the response from actuating on the second device.

6. The method of claim 5, wherein the second device disconnects from the at least two devices and continues to execute the media individually.

7. The method of claim 1, wherein the at least two devices are in at least two different locations.

8. The method of claim 1, wherein the at least two devices comprises any of a smart television, a mobile phone, a home assistant, a robot, and a virtual reality headset.

9. The method of claim 1, wherein the application executed on at least one device of the at least two devices is configured to detect a presence of a user based on sensor data and in response actuate an action.

10. The method of claim 9, wherein the action comprises any of pause the media on the at least one device, play the media on the at least one device, turn off the media on the at least one device, and turn on the media on another device.

11. The method of claim 1, wherein the application executed on the at least two devices is configured to:
   learn user preferences of a respective user; and
   share the user preferences of the respective user with other devices.

12. The method of claim 1, wherein the application executed on the at least two devices is configured to execute a teleconference between users of the at least two devices while executing the media simultaneously.

13. The method of claim 12, wherein the application executed on at least one device of the at least two devices is configured to detect when a user speaks based on sensor data and in response actuate the media to pause.

14. The method of claim 12, wherein a video feed of users and the media are displayed simultaneously on a screen of the at least two devices using the application.

15. The method of claim 1, wherein the application executed on the at least two devices is configured to execute a chatroom between users of the at least two devices while executing the media simultaneously.

16. The method of claim 1, wherein the application executed on at least one device of the at least two devices is configured to detect an interruption based on sensor data and in response pause the media.

17. The method of claim 1, wherein the application is configured to display any of a name of a current media experienced, a progress of the current media experienced, a total length of a media, names of other users experiencing a media simultaneously, reviews of a media, a rating of a media, names of artists involved in creating a media, subtitles, a status of a user, a history of media experienced.

18. The method of claim 1, wherein at least one of:
   the application is configured to receive verbal instructions;
   a data control channel is established between the at least two devices to maintain synchronization; and
   keep alive data packets are sent through the data control channel.

19. A media synchronization system, comprising:
   at least two devices executing a media synchronization application, wherein:

the at least two devices are connected using the application;

a same media is executed in synchronization by the at least two devices using the application;

an input received by the application executed on a first device of the at least two devices actuates a same response on the at least two devices; and the application is configured to, based on user input, create a schedule for experiencing a media, invite at least one user to experience a media immediately or at a schedule time, invite at least one user to dance to a media immediately or at a schedule time, invite at least one user to a live or virtual sporting or gaming event, order a food or beverage and actuate delivery of the food or beverage to a location, add a scheduled media to a calendar, suggest an alternate schedule in response to an invitation to experience a media, create a video chat, create a text chat, create a favorites list, and share a favorites list.

20. The media synchronization media of claim 19, wherein:

the media comprises any of video, audio, and a virtual reality simulation;

the response comprises any of an instruction to play the media, an instruction to pause the media, an instruction to rewind the media, and an instruction to fast forward the media;

the at least two devices comprises any of a smart television, a mobile phone, a home assistant, a robot, and a virtual reality headset; and the application is configured to display any of a name of a current media experienced, a progress of the current media experienced, a total length of a media, names of other experiencing a media simultaneously, reviews of a media, a rating of a media, names of artists involved in creating a media, subtitles, a status of a user, a history of media experienced.

* * * * *